(12) United States Patent
Anderson

(10) Patent No.: US 6,298,401 B1
(45) Date of Patent: *Oct. 2, 2001

(54) OBJECT ORIENTED STORAGE DEVICE HAVING A DISC DRIVE CONTROLLER PROVIDING AN INTERFACE EXPOSING METHODS WHICH ARE INVOKED TO ACCESS OBJECTS STORED IN A STORAGE MEDIA

(75) Inventor: David B. Anderson, Minnetonka, MN (US)

(73) Assignee: Seagate Technology LLC, Scotts Valley, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/131,544

(22) Filed: Aug. 10, 1998

Related U.S. Application Data

(60) Provisional application No. 60/054,737, filed on Aug. 11, 1997.

(51) Int. Cl.[7] .............................. G06F 3/06; G06F 17/30
(52) U.S. Cl. ............................ 710/74; 710/72; 707/103
(58) Field of Search ........................ 710/74, 72; 709/315; 707/103

(56) References Cited

U.S. PATENT DOCUMENTS

| | | | |
|---|---|---|---|
| 4,953,080 | 8/1990 | Dysart et al. | 364/200 |
| 5,187,786 | 2/1993 | Densmore et al. | 395/600 |
| 5,226,168 | 7/1993 | Kobayashi et al. | 395/800 |
| 5,371,885 | 12/1994 | Letwin | 395/600 |
| 5,394,526 | 2/1995 | Crouse et al. | 395/600 |
| 5,463,774 | 10/1995 | Jenness | 395/600 |
| 5,488,721 * | 1/1996 | Rich et al. | 707/103 |
| 5,504,892 | 4/1996 | Atsatt et al. | 395/600 |
| 5,548,724 | 8/1996 | Akizawa et al. | 295/200.03 |
| 5,550,976 | 8/1996 | Henderson et al. | 395/200.06 |
| 5,594,862 | 1/1997 | Winkler et al. | 395/182.03 |
| 5,613,099 * | 3/1997 | Erickson et al. | 709/303 |
| 5,615,363 | 3/1997 | Jenness | 395/614 |
| 5,617,425 | 4/1997 | Anderson | 371/10.2 |
| 5,655,080 | 8/1997 | Dias et al. | 395/200.32 |
| 5,724,581 | 3/1998 | Kozakura | 395/618 |
| 5,771,379 * | 6/1998 | Gore, Jr. | 707/101 |
| 5,915,253 * | 6/1999 | Christiansen | 707/103 |

OTHER PUBLICATIONS

Apparatus to remove logical vs. physical drive management, IBM TDB, vol. 33, No. 6A, Nov. 1990, pp 188–189.*

"Apparatus to Remove Logical vs. Physical Drive Management", IBM Technical Disclosure Bulletin, vol. 33, No. 6A, Nov. 1990, pp. 188–189.

"An object Oriented model for Distributed Backup and Archive", by David A. Low, *IEEE*, 1995, pp. 428–433.

"The Use of Decomposition in an Object–oriented Approach to Present and Represent Multimedia Documents", by R. Cordes, M. Hofmann, H. Langendorfer and R. Buck–Emden, *IEEE*, 1989, pp. 820–828.

(List continued on next page.)

*Primary Examiner*—Thomas Lee
*Assistant Examiner*—Ilwoo Park
(74) *Attorney, Agent, or Firm*—Joseph R. Kelly; Westman, Champlin & Kelly, P.A.

(57) ABSTRACT

A data storage device includes storage media having stored thereon data configured as a plurality of objects, each object having attributes indicative of characteristics of the object. A control component is operably coupled to the storage media and is configured to provide an interface to the objects. The interface exposes methods which are invoked to access the objects.

45 Claims, 14 Drawing Sheets

OTHER PUBLICATIONS

"Filesystems for Network–Attached Secure Disks", by Garth A. Gibson et al., Jul. 1997, School of Computer Science, Carnegie Mellon University, Pittsburgh, Pennsylvania.

"A Case for Redundant Arrays of Inexpensive Disks (RAID)", by David A. Patterson, Garth Gibson and Randy H. Katz, Dec. 1987, Computer Science Division, University of California.

* cited by examiner

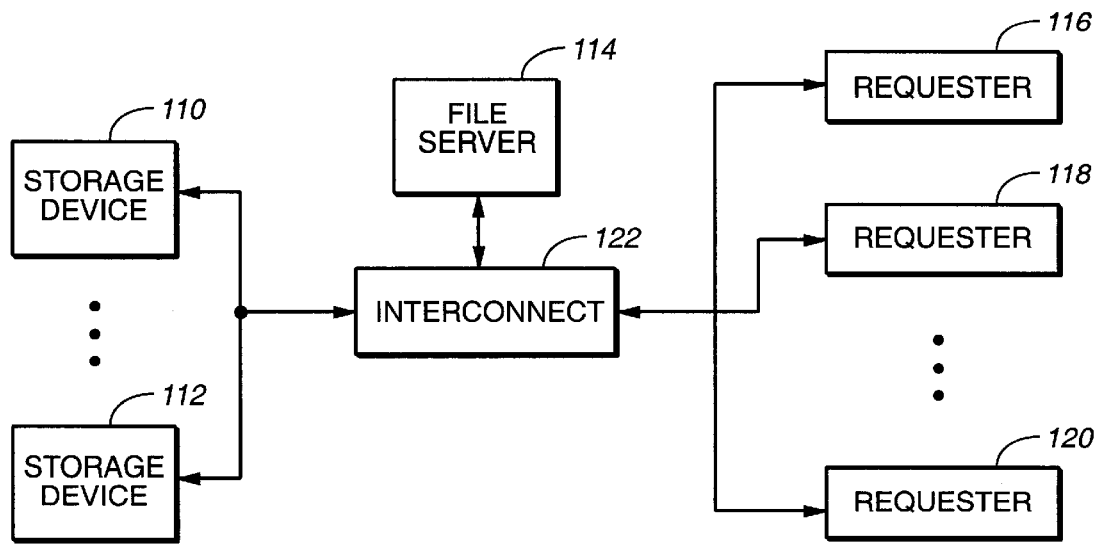
FIG._1
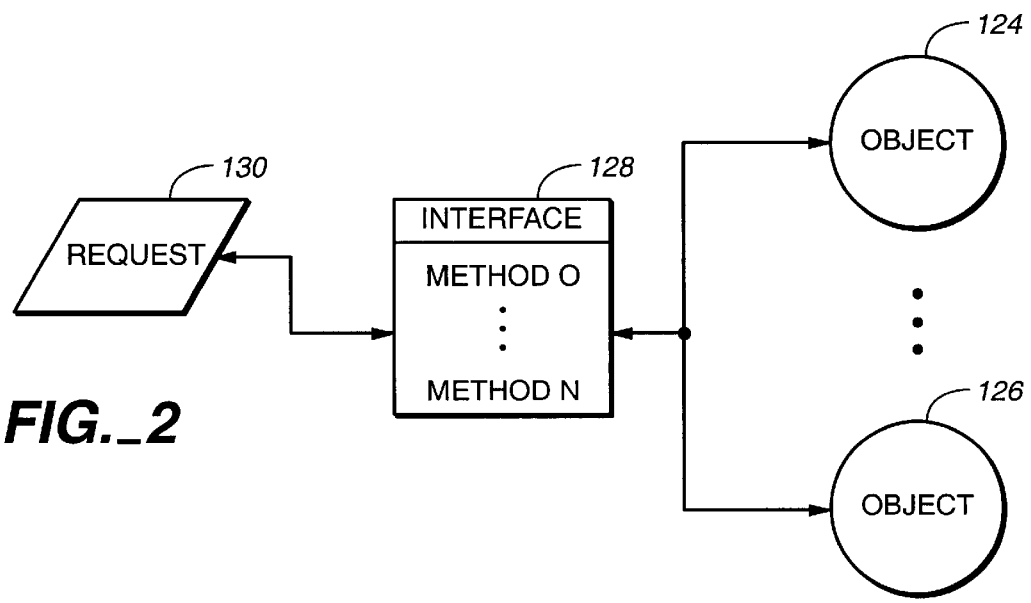
FIG._2

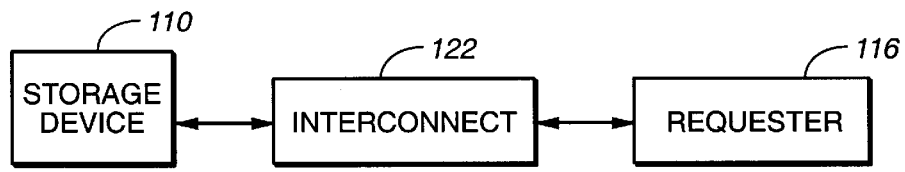
FIG._3-1
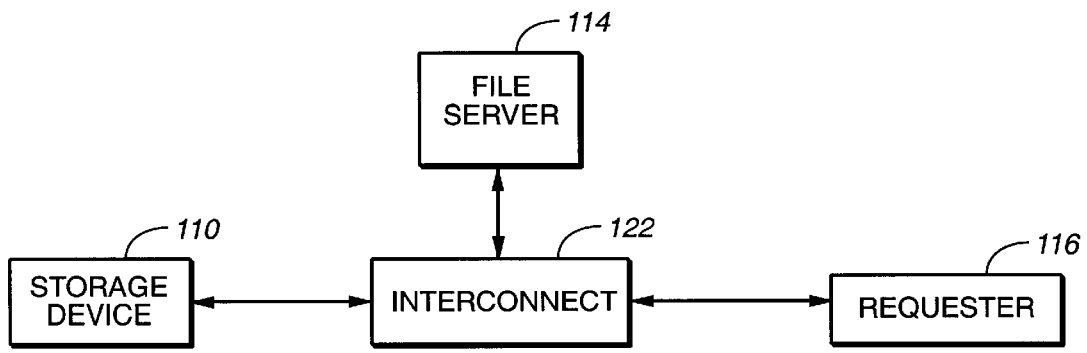
FIG._3-2
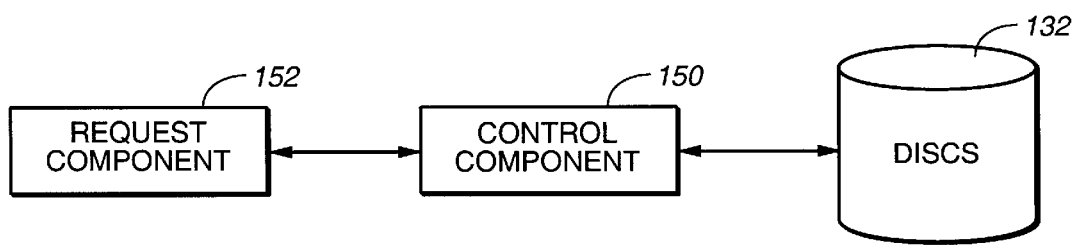
FIG._5

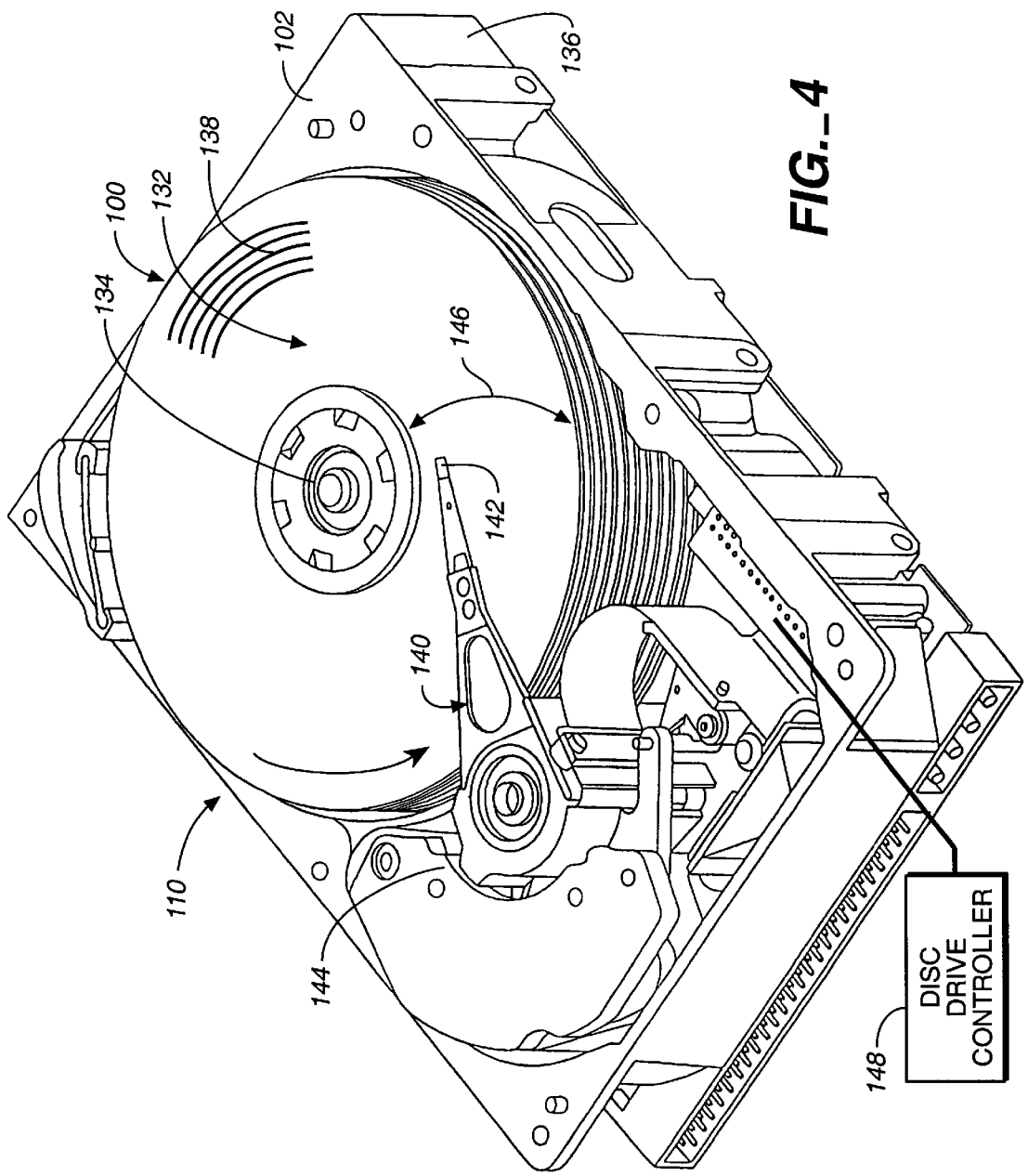
FIG._4

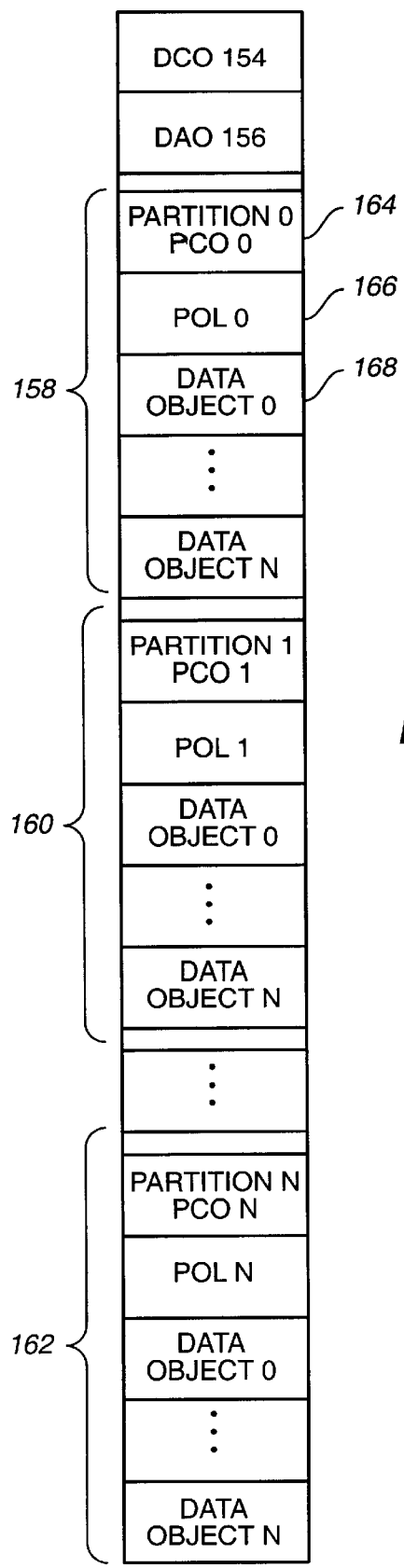
FIG._6

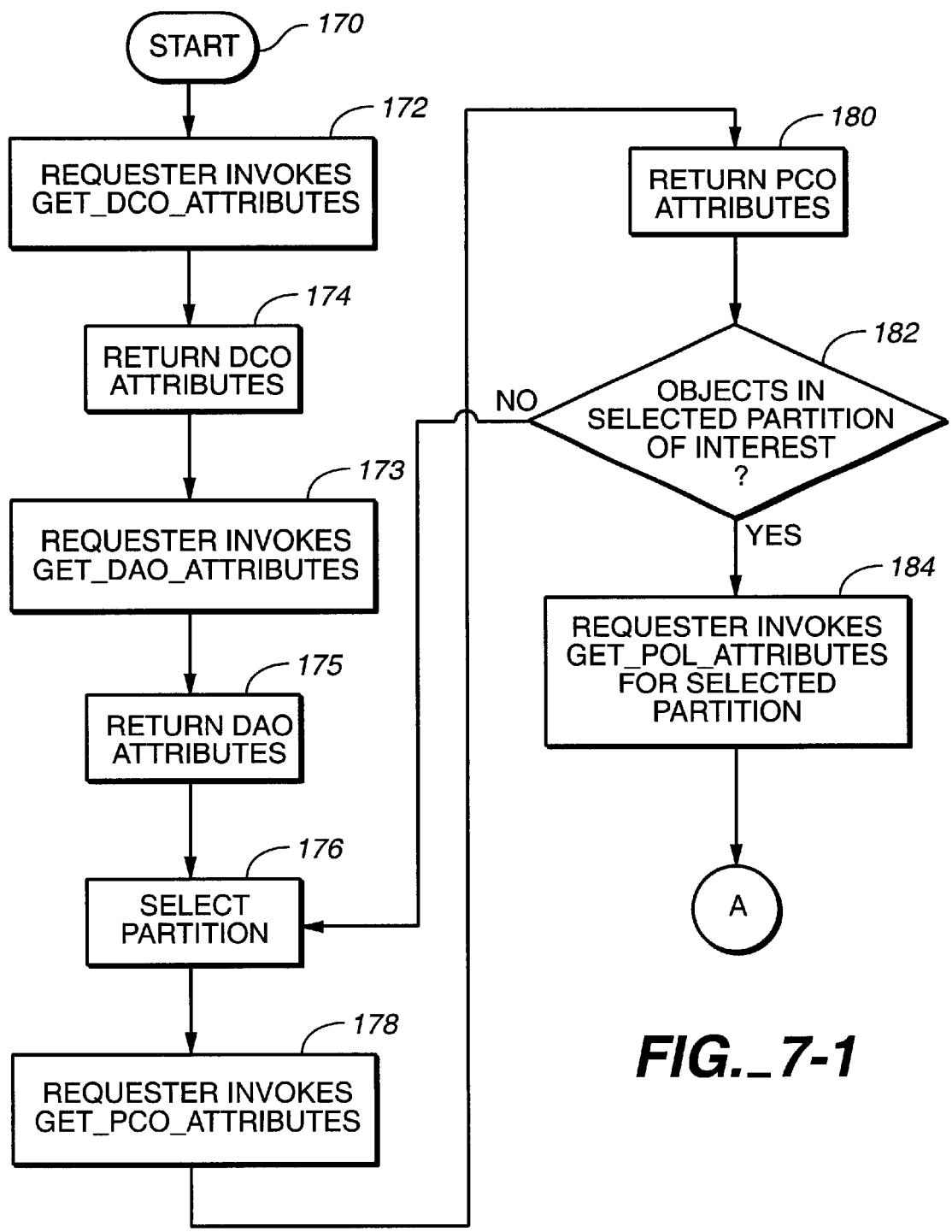
FIG._7-1

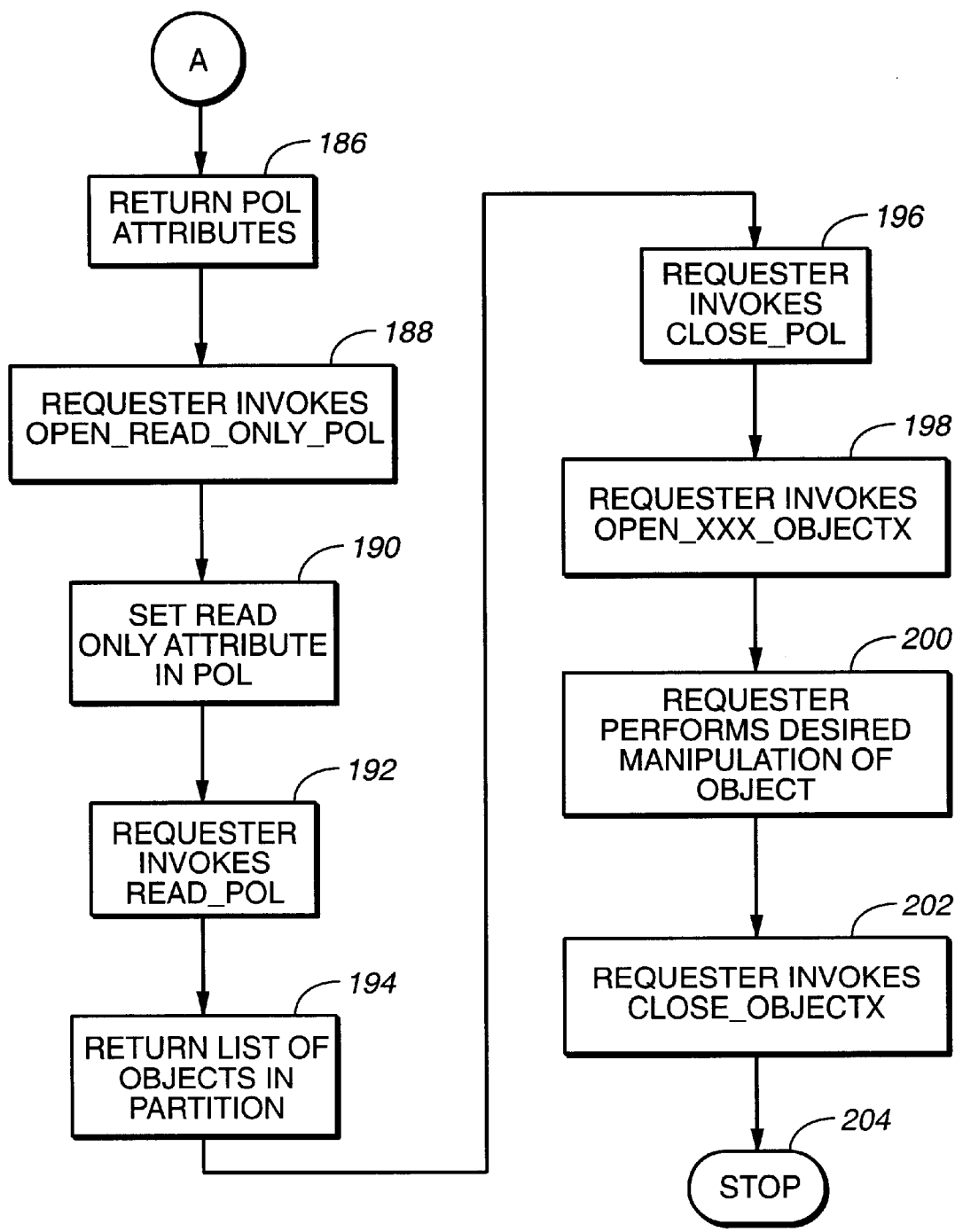
FIG._7-2

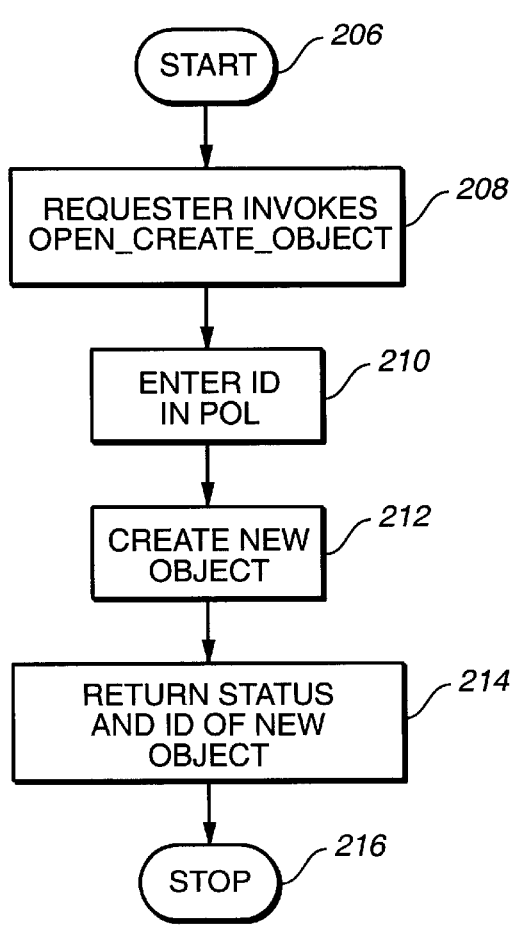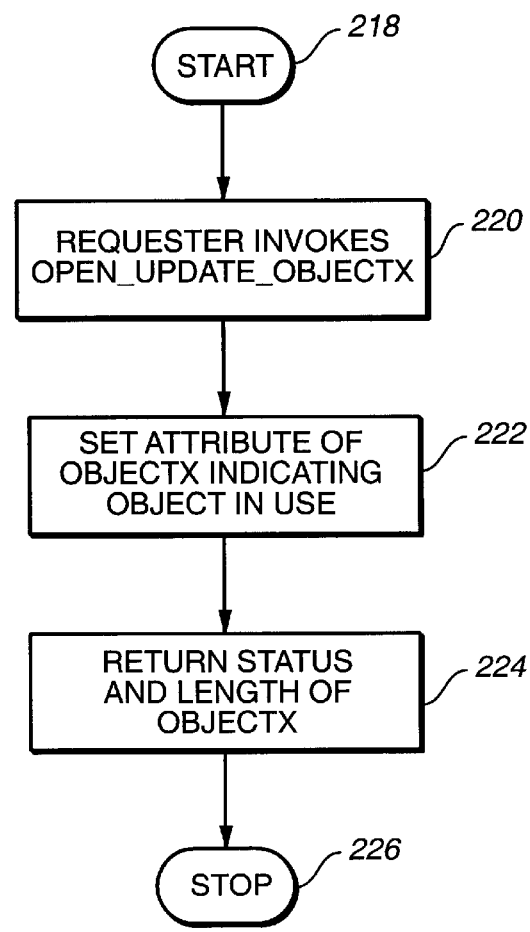
FIG._8          FIG._9

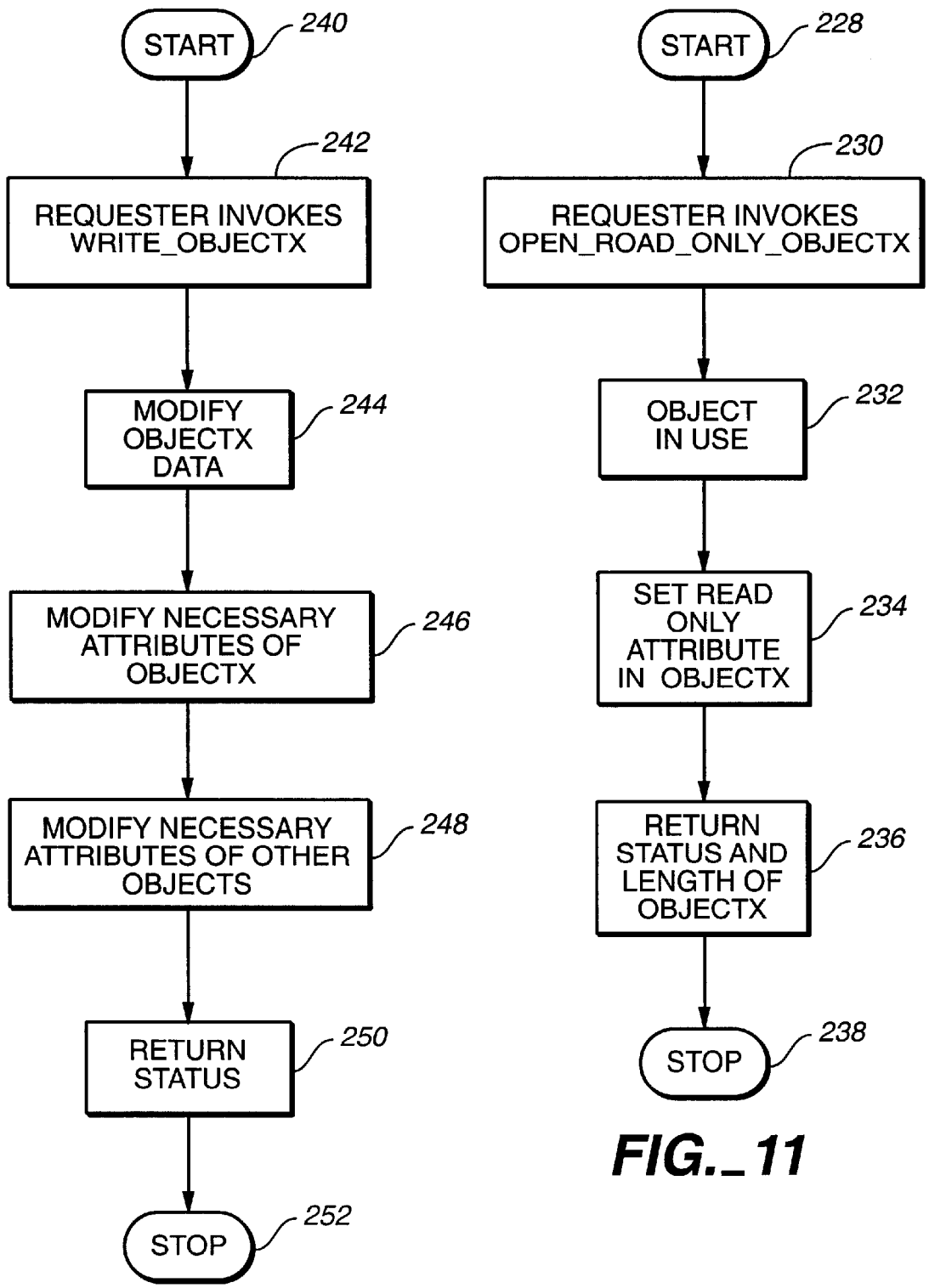
FIG._10
FIG._11

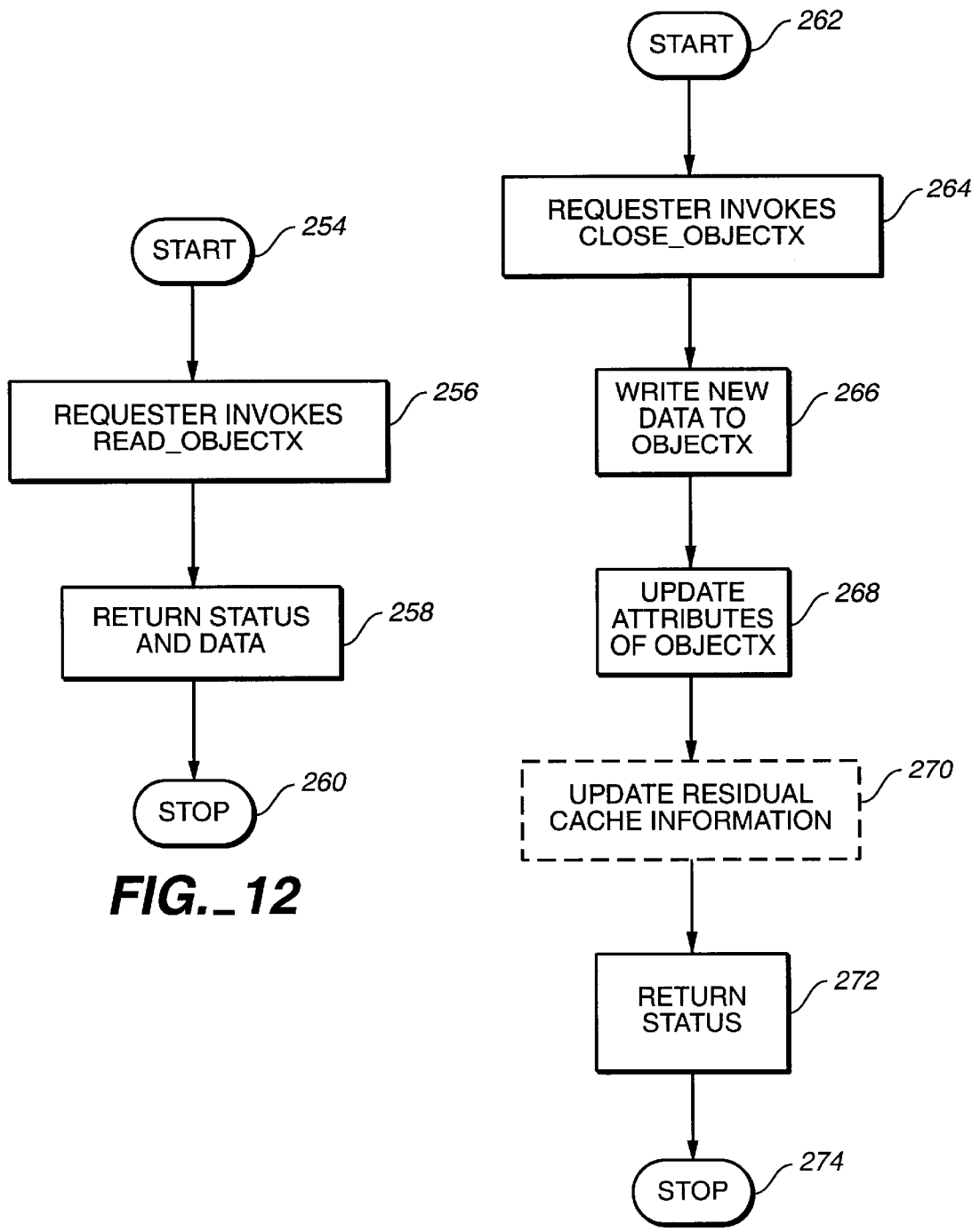
FIG._12
FIG._13

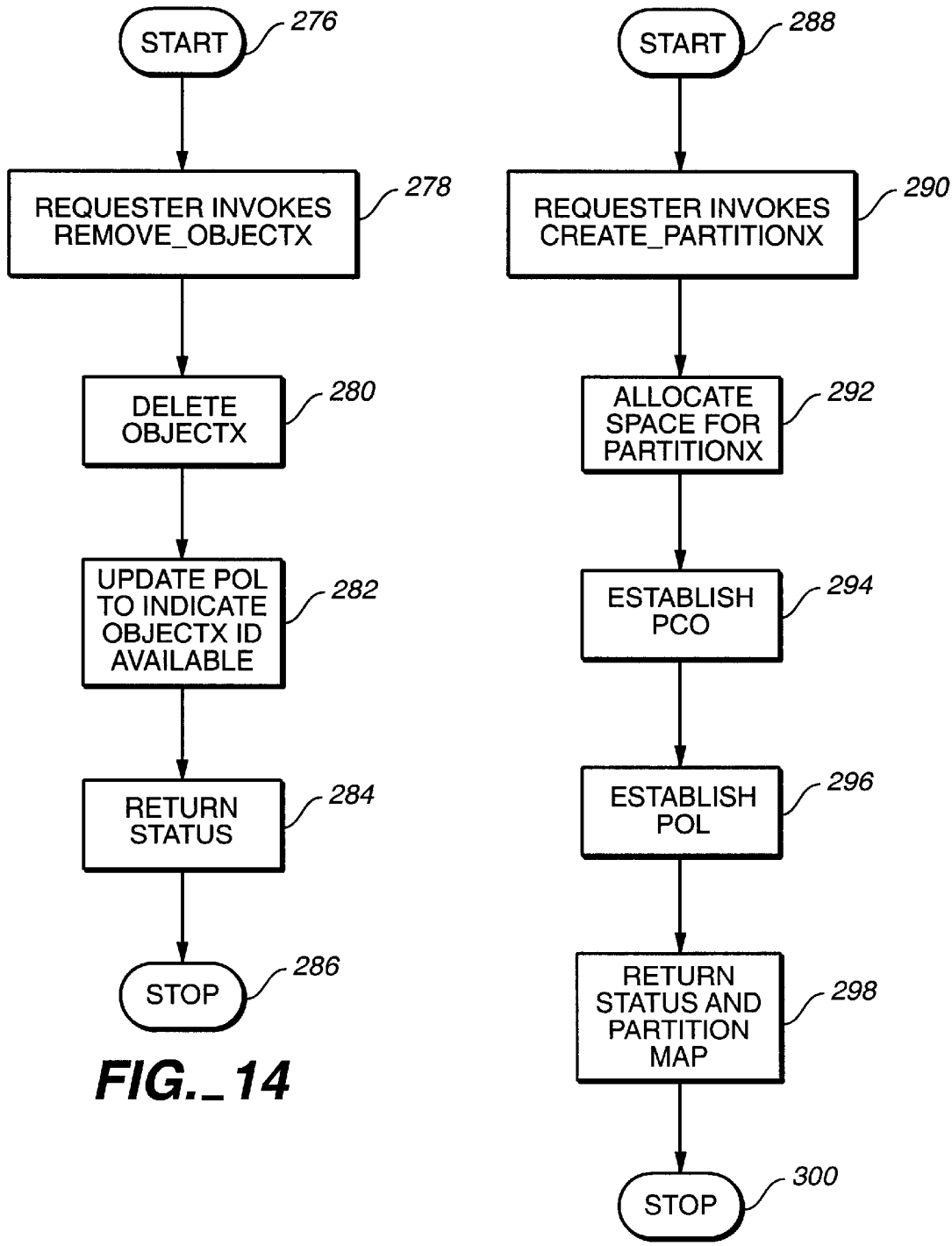
FIG._14
FIG._15

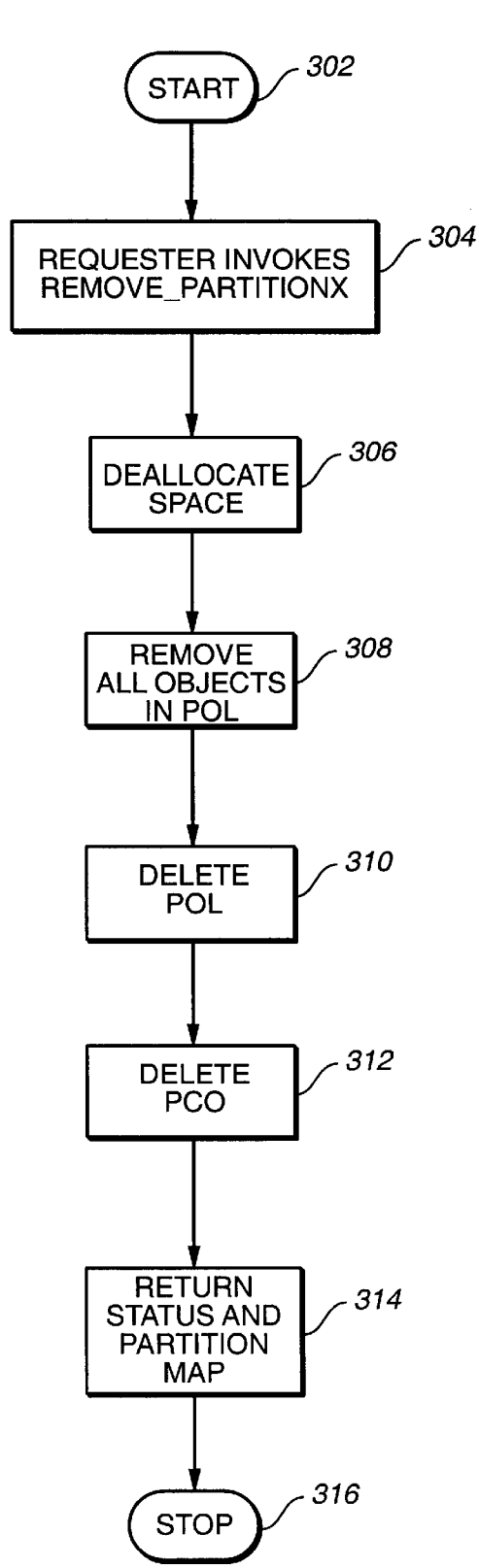
FIG._16
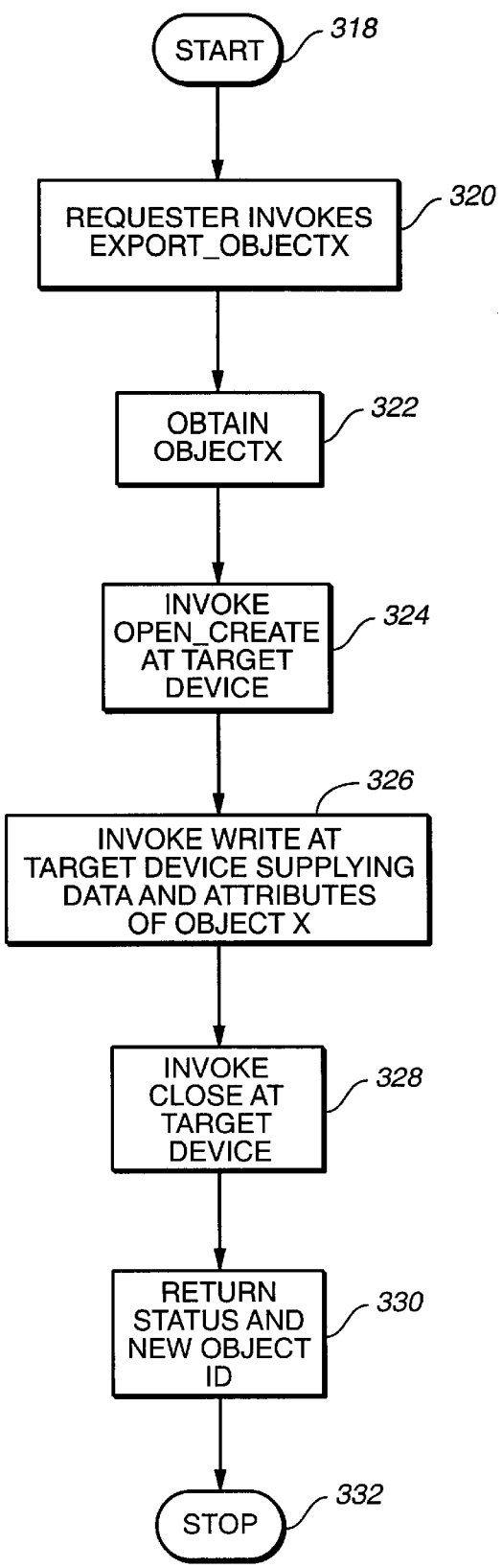
FIG._17

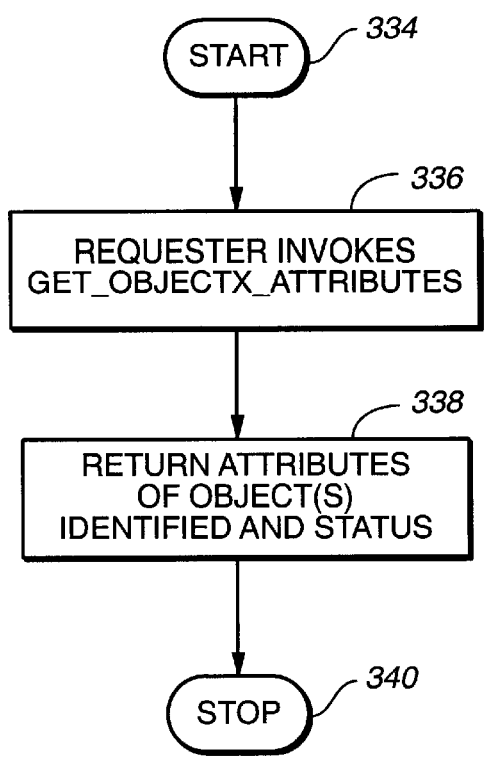
FIG._18
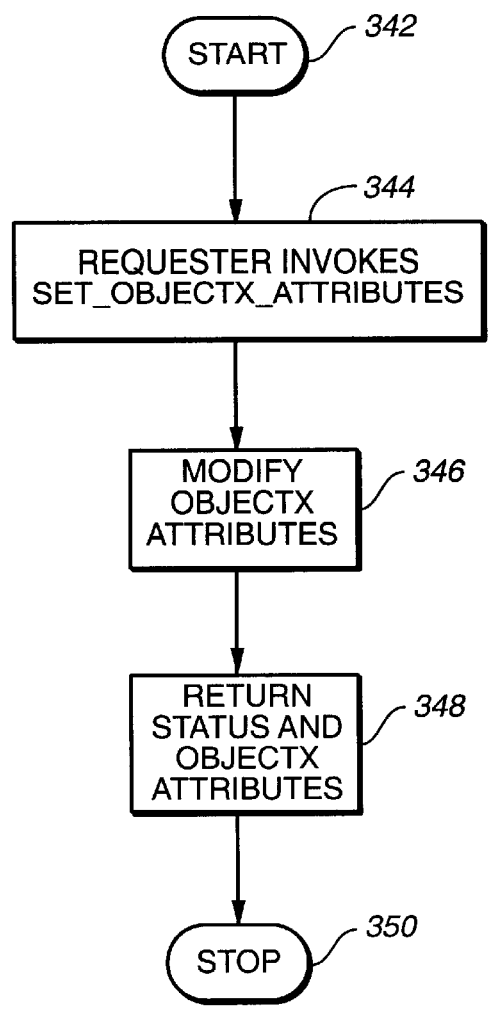
FIG._19

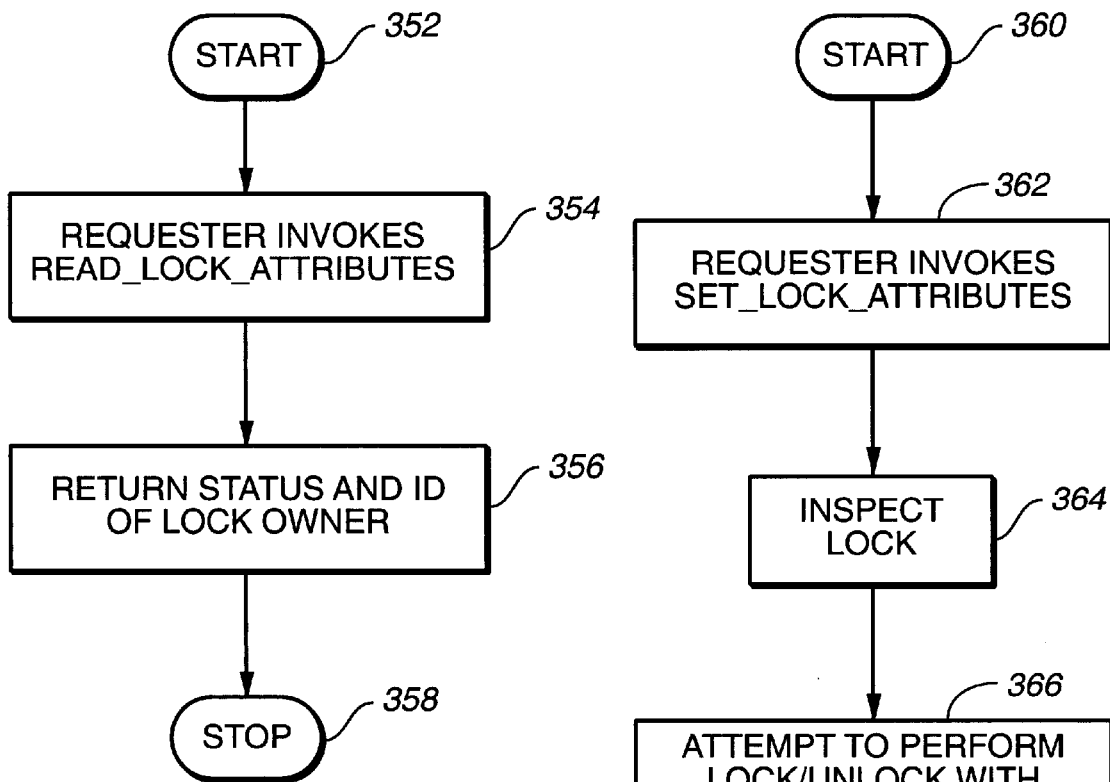
FIG._20
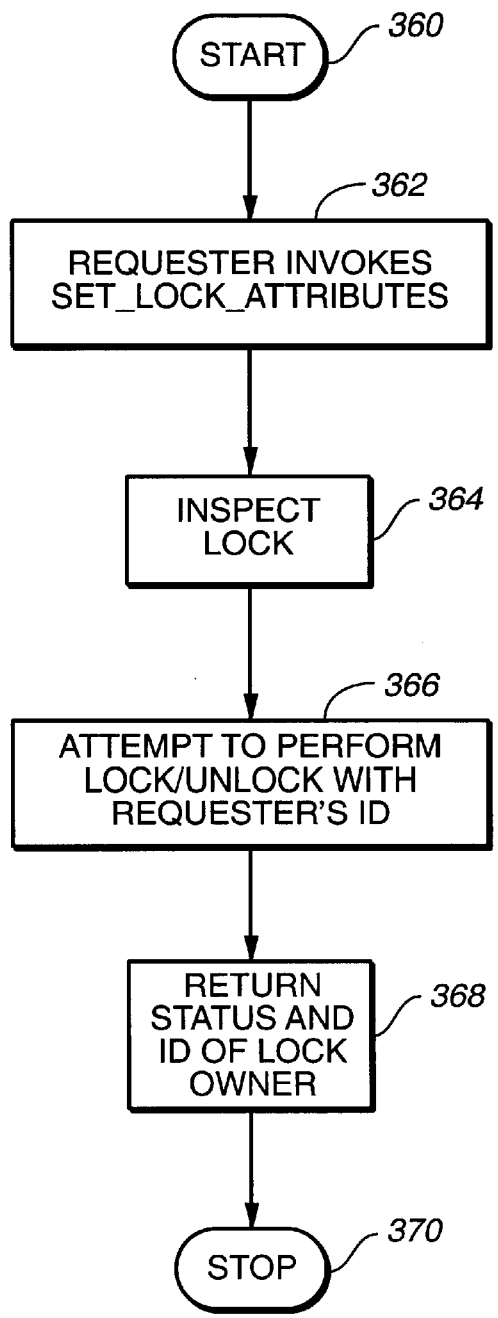
FIG._21

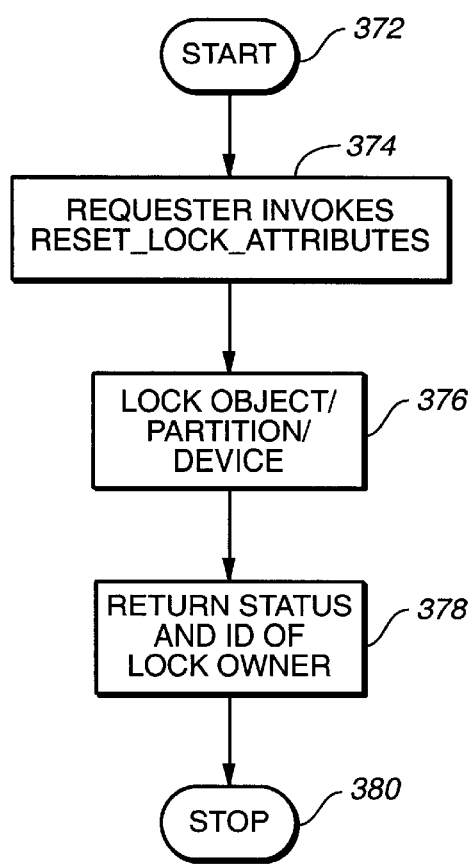
FIG._22
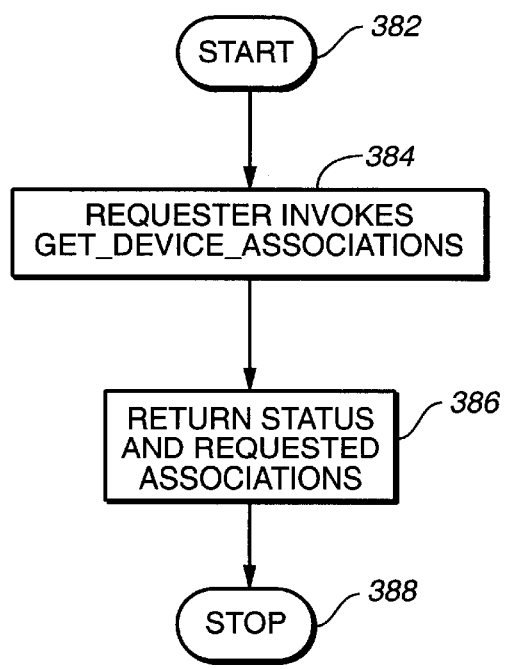
FIG._23
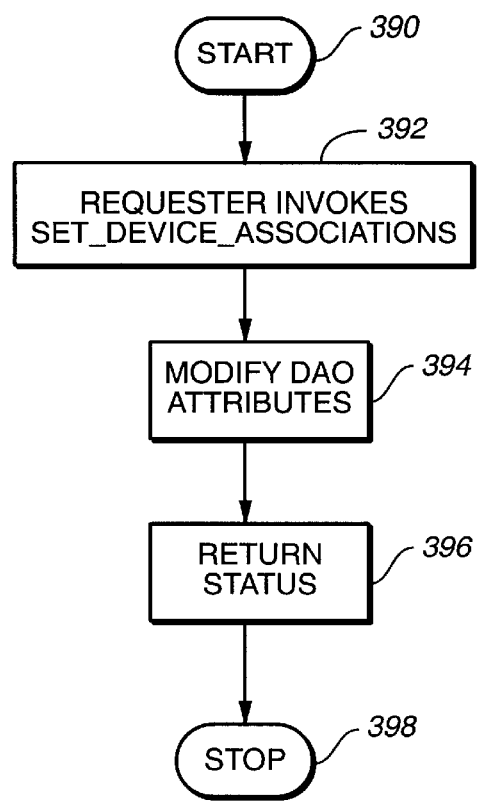
FIG._24

OBJECT ORIENTED STORAGE DEVICE HAVING A DISC DRIVE CONTROLLER PROVIDING AN INTERFACE EXPOSING METHODS WHICH ARE INVOKED TO ACCESS OBJECTS STORED IN A STORAGE MEDIA

REFERENCE TO RELATED APPLICATION

The present application claims priority from U.S. provisional application Ser. No. 60/054,737 filed on Aug. 11, 1997

FIELD OF THE INVENTION

The present invention relates to data storage devices. More specifically, the present invention relates to a data storage device, such as a disc drive, tape drive, or optical drive, in which data is organized and accessed as objects.

BACKGROUND OF THE INVENTION

Two conventional computer models have become well known in the industry of computing. The first is a mainframe computing model and the second is a clustered computing model.

The traditional progression for an end user in the mainframe computing model is to purchase an initial system, and when additional processing capabilities are required, to replace the initial system with a bigger system. At various points in this cycle, traumatic discontinuities occur. For example, if the user outgrows the architecture of the initial system, the user may need to convert from one operating system to another, or even from one vendor's proprietary architecture to that of another vendor, when the second upgraded mainframe system is purchased. These changes entail enormous costs for the organization purchasing the upgrade, in both dollars and employee time. Therefore, such conversions are avoided, in many cases.

In addition, the mainframe model entails poor residual value of computer equipment. Thus, the system replacement often results in invested capital which is substantially completely lost when the initial system is replaced by an upgraded system. Further, larger upgraded systems tend to be sold in lower volumes then smaller systems. Thus, each new system upgrade typically has a higher cost of computing than the previous system.

In a clustered computing model, a mainframe computer is replaced with a cluster of smaller, standards-based servers. This can offer many advantages over the mainframe model. Since the cluster may start off as only a single system, the threshold to entering the cluster model is lower. Further, such smaller systems are typically sold in high volume, making the cost of computing less. Also, such systems are standards based in that they do not exhibit dependence on proprietary architectures. This provides for the availability of equipment from multiple sources which allows the user to choose the best alternative with each subsequent purchase.

Still other advantages present themselves with the clustered computing model. Upgrade costs can be controlled more precisely by adding only the amount of additional resources required to meet existing and immediate future needs. Further, the user can choose from a wide variety of vendors, without concern about migration or conversion to a new architecture. Similarly, with the right architecture, there may never be a need for conversion to another operating system.

Still, the clustered computing model does have disadvantages and problems. For example, the clustered computing model encounters difficulty in providing clustered systems with the ability to share data in a way that allows the cluster to take on the workload that a single mainframe could perform. For example, it is currently very difficult to implement clustered models where each of the servers in the cluster are required to process transactions on the same data. Examples of some such applications include an airlines reservations system or a financial institution's complete inventory of transactions.

The second disadvantage of the clustered computing model simply involves the lack of extensive experience in managing storage and data which exists in the mainframe environment. Such experience has evolved into management software that is simply not yet available in the standards based cluster environment.

The present invention addresses these and other problems, and offers other advantages over the prior art.

SUMMARY OF THE INVENTION

A data storage device includes storage media having stored thereon data configured as a plurality of objects, each object having attributes indicative of characteristics of the object. A control component is operably coupled to the storage media and is configured to provide an interface to the objects. The interface exposes methods which are invoked to access the object.

BRIEF DESCRIPTION OF THE DRAWINGS

FIG. 1 is a block diagram of a network attached storage system in accordance with one aspect of the present invention.

FIG. 2 illustrates an object model in accordance with one aspect of the present invention.

FIG. 3-1 is a block diagram of a first configuration in which an object on the storage device is accessed by a requester.

FIG. 3-2 is a block diagram of a second configuration in which an object on a storage device is accessed by a requester.

FIG. 4 is a perspective view of a disc drive in accordance with one aspect of the present invention.

FIG. 5 is a functional block diagram illustrating access of an object by a requester.

FIG. 6 illustrates a portion of a storage media partitioned in accordance with one aspect of the present invention.

FIGS. 7-1 and 7-2 show a flow diagram illustrating access of an object by a requester in accordance with one aspect in accordance of the present invention.

FIG. 8 is a flow diagram illustrating creation of an object in accordance with one aspect of the present invention.

FIG. 9 is a flow diagram illustrating opening and updating of an object in accordance with one aspect of the present invention.

FIG. 10 is a flow diagram which illustrates writing to an object in accordance with one aspect of the present invention.

FIG. 11 is a flow diagram which illustrates opening an object for read only purposes in accordance with one aspect of the present invention.

FIG. 12 is a flow diagram which illustrates reading an object in accordance with one aspect of the present invention.

FIG. 13 is a flow diagram which illustrates closing an object in accordance with one aspect of the present invention.

FIG. 14 is a flow diagram which illustrates removing an object in accordance with one aspect of the present invention.

FIG. 15 is a flow diagram which illustrates creating a partition in accordance with one aspect of the present invention.

FIG. 16 is a flow diagram which illustrates removing a partition in accordance with one aspect of the present invention.

FIG. 17 is a flow diagram which illustrates exporting an object in accordance with one aspect of the present invention.

FIG. 18 is a flow diagram which illustrates obtaining object attributes in accordance with one aspect of the present invention.

FIG. 19 is a flow diagram which illustrates setting or modifying object attributes in accordance with one aspect of the present invention.

FIG. 20 is a flow diagram which illustrates reading lock attributes in accordance with one aspect of the present invention.

FIG. 21 is a flow diagram which illustrates setting lock attributes in accordance with one aspect of the present invention.

FIG. 22 is a flow diagram which illustrates resetting lock attributes of an object in accordance with one aspect of the present invention.

FIG. 23 is a flow diagram which illustrates obtaining device associations in accordance with one aspect of the present invention.

FIG. 24 is a flow diagram which illustrates setting device associations in accordance with one aspect of the present invention.

DETAILED DESCRIPTION OF THE PREFERRED EMBODIMENTS

FIG. 1 is a block diagram of a data storage system 100 in accordance with one aspect of the present invention. System 100 includes object oriented data storage devices 110 and 112, file server 114, requesters 116, 118 and 120, and interconnect 122. System 100 illustrates a network attached storage configuration which can be constructed of equipment and software from many different vendors, and which appear to users as a single large computer system.

Object oriented storage devices 110–112 are the storage components which perform the data storage function of System 100. Storage devices 110–112 preferably include disc drives, redundant arrays of independent discs (RAID) subsystems, tape drives, tape libraries, optical drives, juke boxes or any other storage device which can be shared. Storage devices 110 and 112 are also provided with an input/output (I/O) channel attachment to requesters 116, 118 and 120, which will access devices 110 and 112.

Requesters 116, 118 and 120 are components, such as servers or clients, which share information stored on devices 110 and 112. Requesters 116–120 are also preferably configured to directly access the information on storage devices 110 and 112.

File server 114 performs management and security functions, such as request authentication and resource location. In smaller systems, a dedicated file server is preferably not used. Instead, one of requesters 116–120 assumes the function and responsibility of overseeing the operation of system 100 carried out by file server 114. In addition, where security and functionality provided by file server 114 is not needed or desired, or where an overriding need for performance requires that the cluster of requesters 116–120 talk directly with storage devices 110 and 112, file server 114 is eliminated from system 100.

Interconnect 122, in one preferred embodiment, is the physical infrastructure over which all components in network attached storage system 100 communicate with one another.

In operation, when System 110 is powered up, all devices preferably identify themselves either to each other or to a common point of reference, such as file server 114 or interconnect 122. For instance, in a Fiber Channel based system 100, object oriented storage devices 110 and 112, and requesters 116–120 log onto the fabric of the system. Any component of system 110, in such an implementation, which desires to determine the operating configuration can use fabric services to identify all other components. From file server 114, requesters 116–120 learn of the existence of storage devices 110 and 112 with which requesters 116–120 can have access. Similarly, storage devices 110 and 112 learn the location of information required to locate other devices in system 100 and the address which must be used to invoke a management service, such as backup. Similarly, file server 114, in one preferred embodiment, learns of the existence of storage devices 110 and 112 from the fabric services.

Depending on the security practice of a particular system 100, requesters 116–120, or any of them, may be denied access to some components of system 100. From the set of storage devices 110 and 112 available to each requester, that requester can then identify the files, data bases, and free space available to it.

At the same time, each component in system 100 preferably identifies to the file server 114 any special considerations associated with it. For example, any storage device level service attributes can be communicated once to file server 114, and all other components in system 100 then learn of those attributes from file server 114. For instance, a particular requester 116–120, may wish to be informed of the introduction of additional storage devices, subsequent to start up. Such an attribute may be provided, for example, when the requester logs onto file server 114. File server 114 then automatically advises that particular requester 116–120 whenever new storage devices are added to system 100. File sever 114 may then typically also pass to the requester other important characteristics such as whether the storage device is a RAID 5, mirrored, etc., storage device.

In accordance with one aspect of the present invention, the information stored on storage devices 110 and 112 is stored with a system better illustrated in FIG. 2. Each of storage devices 110 and 112 are preferably object oriented devices which operate in a mode in which data is organized and accessed as objects 124–126 rather than as an ordered sequence of sectors. The object oriented devices 110 and 112 manage objects 124–126 with an object file system which illustratively includes a single level list of the objects for each partition on the particular device. This is also referred to as a flat file system. The objects 124–126 which are stored on the storage medium in each device 110 and 112 are preferably the smallest visible units of capacity allocation on a device 110 or 112 which is operating in object oriented device mode. An object on such a storage device includes an ordered set of sectors associated with a unique identifier. Data is referenced by the identifier and an offset into the object. The object is allocated and placed on the storage media by the storage device 110 or 112, itself, while the operating system manages its files and metadata in these object constructs, instead of managing sectors of data, as it does in prior architectures.

The objects 124–126 are accessed by an interface 128 in which the objects expose a plurality of methods which can be invoked by a requester 116–120 in order to access and manipulate attributes and data in objects 124–126. Thus, as shown in FIG. 2, a request 130 is issued from a requester 116–120. In a preferred embodiment, requesters 116–120 are computer systems, or an element in a cluster or network of systems, which submits request 130 for action on a storage device which contains objects 124–126. Thus, requesters 116–120 may be both clients and servers. In any case, request 130 which is issued by one of requesters 116–120 invokes one of the methods in interface 128, which, in turn, causes the manipulation of one or more of objects 124–126, as will be described in greater detail later in the application.

FIGS. 3-1 and 3-2 are block diagrams of two different configurations which can be used to access objects stored on storage devices 110–112. For the sake of simplicity, only a single requester 116 and a single object oriented storage device 110 is illustrated in FIGS. 3-1 and 3-2. When requester 116 wishes to open an object (such as object 124–126) requester 116 may be able to directly access storage device 110, or it may be required to request permission from file server 114 and the location information, in order to access an object on storage device 110. The extent to which file server 114 controls access to storage device 110 is primarily a function of the security requirements of the particular implementation of system 100.

In the block diagram illustrated in FIG. 3-1, system 100 is assumed to be secure. That is, there is no requirement to protect the transmission of command information and data between requester 116 and storage device 110. In such an implementation, there still may be a file server 114 present for management functions, but file server 114 is not needed to oversee requester interaction with storage device 110.

In such an implementation, requester 116 is in a position to access and create objects directly on storage device 110. Requester 116 can thus open, read, write and close objects as if they were natively attached to requester 116. Such operations are described in greater detail later in the application. A brief overview is provided at this point, however, simply for the sake of clarity. In order to read an object on storage device 110, requester 116 may preferably first read from one or more objects which reveal the logical volumes or partitions on storage device 110, and how to begin searching for an object stored thereon. Requester 116 then opens and reads an object, which may be a root directory. From this object, locating other objects is straight forward, and is based on the contents of the root directory. Requester 116 repeats the process until the desired data is located. Data is referenced by an object identification (object ID) and a displacement within the object.

In a second implementation illustrated in FIG. 3-2, security is required. Therefore, file server 114 is interposed into the I/O chain between requester 116 and storage device 110, to a degree necessary for the desired level of protection. In one preferred embodiment, requester 116 must first request permission from file server 114 to perform a set of I/O operations. File server 114, (which may have withheld storage location information from requester 116 for additional security) then accredits the request from requester 116 by returning sufficient information to allow requester 116 to communicate directly with storage device 110. Since storage device 110 is preferably informed of the security parameters when storage device 110 logs onto file server 114, storage device 110 preferably does not allow an I/O request unless it is properly constructed and includes encoded data which includes valid permission from file server 114.

Then, the process proceeds in a similar fashion to that described which respect to FIG. 3-1. However, the payload associated with each command may be quite different. For example, in the case where security is required (showing FIG. 3-2) both commands and data which pass between requester 116 and storage device 110 may be encrypted. In addition, permission information must preferably be added to the command parameters provided from requester 116 to storage device 110.

Since storage devices 110 and 112 can, in one preferred embodiment, include hard disc drives, a brief discussion of a disc drive is in order. FIG. 4 is a perspective view of a hard disc drive, which can be implemented as storage device 110. In disc drive 110, a plurality of discs 132 are journaled about a spindle motor assembly 134 within a housing 136. Each disc 132 has a multiplicity of concentric circular recording tracks, indicated schematically at 138. Each track 138 is subdivided into a plurality of partitions (described in greater detail with respect to FIG. 6). Data can be stored on, or retrieved from, discs 132 by referring to a specific partition within a track 138. An actuator arm assembly 140 is rotatably mounted preferably in one corner of housing 136. The actuator arm assembly 140 carries a plurality of head gimbal assemblies 142, which each carry a slider having a read/write head, or transducer (not shown) for reading information from and writing information onto discs 132.

A voice coil motor 144 is adapted to precisely rotate the actuator arm assembly 140 back and forth such that the transducers on sliders 142 move across the surface of discs 132 along an arch generally indicated by arrow 146. FIG. 4 also illustrates, in block diagram form, a disc drive controller 148, which is used in controlling certain operations of disc drive 110 in a known manner. However, in accordance with the present invention, disc drive controller 148 is also used in implementing interface 128 to objects 124–126 stored on discs 132.

FIG. 5 is a block diagram of a portion of disc drive 110 as it fits within system 100 shown in FIG. 1. In FIG. 5, disc drive controller 148 includes a control component 150 which implements interface 128. Objects 124–126 are stored on the storage medium which constitutes disc 132. Request component 152 is implemented on a requester 116–120, and is formed to logically formulate requests which invoke methods in interface 128. Control component 150, upon the invocation of a method, carries out certain tasks in order to manipulate identified objects in a desired way. Control component 150 returns an event, which can include data or attributes associated with any identified object. The event is also returned based upon the particular method invoked by the requester 116–120.

In order for object oriented devices 110–112 to provide the same functionality delivered by an operating system with block oriented devices, storage space on devices 110–112 must be manageable to a similar degree. Thus, in one preferred embodiment, an organizational layer on storage devices 110–112 is provided above objects 124–126 which are stored thereon. In one preferred embodiment, object oriented storage devices 110–112 provide for allocating disc space into one or more mutually exclusive regions, referred to as partitions. Partitions are described in greater detail with respect to FIG. 6. Within a partition, a requester 116–120 can create objects. In one preferred embodiment, the structure within a partition is a simple, flat organization. Onto this organization, any operating system can map its own structures.

FIG. 6 illustrates a portion of storage space on a storage medium, such as one of discs 132. The storage space includes a number of objects, such as a device control object 154, a device association object 156, and a plurality of partitions labeled as partition 0 (also designated by numeral 158), partition 1 (also designated by numeral 160) and partition N (also designated by numeral 162). Each partition also includes a number of objects such as partition control object 164, partition object list 166, and a plurality of data objects 168 (labeled data object 0-data object N).

Associated with each object is a set of attributes. In accordance with one aspect of the present invention, an access control attribute is provided which is set by a Set Attribute method (discussed in greater detail later in the application) and provides means by which access to a particular object is controlled. By changing the version number of the access control attribute, certain requesters 116–120 can be denied or given, access to the particular object.

The clustering attribute is an attribute which indicates whether the particular object should desirably be located near another object in the storage system. The cloning attribute indicates whether the particular object was created by copying another object in the storage system. A group of size attributes define the size characteristics of the particular object. For instance, the group of size attributes includes information indicative of the largest offset written within the object, the number of blocks allocated for the object, the number of blocks used to store data within the object and the number of bytes per block within the object.

A group of time attributes indicates when the object was created, the last time data in the object was modified, and the last time an attribute was modified in the object. The object also may preferably include a set of attributes which define the last time that any data in the file system was modified and that any attribute in the file system was modified. Other attributes can also be provided, in order to indicate other parameters, characteristics or features of any given object.

Each object is also associated with an object identifier which is chosen by the particular storage device 110–112 and returned to the requester 116–120 in response to the command to create an object. The identifier is preferably an unsigned integer of a specified length. In one preferred embodiment, the length of the identifier defaults to a size specified by a particular storage device 110–112, or it can be set as a device attribute. Further, in one preferred embodiment, a predefined subset of identifiers (IDs) is reserved for well known objects, special uses, and other special functions which may desirably be performed.

FIG. 6 illustrates that the storage medium typically includes a number of well known objects which always have a specific object ID. In some cases, such well known objects exist on every device or in every partition.

For example, one such well known object is the device control object 154, which preferably contains attributes maintained by each device 110–112, and which relate to the device itself or to all objects on the device. The attributes are maintained by the Set_Attribute method which is described later in the application. In one preferred embodiment, there is one device control object 154 per device 110–112.

Table 1 illustrates one set of preferable device control object (DCO) attributes.

TABLE 1

| Type | Name | Bytes | Semantics |
|------|------|-------|-----------|
| Security | Clock | 8 | monotonic counter |
| | Master Key | 8 | master key, controlling device key |
| | Device Key | 8 | device key, controlling partition keys |
| | Protection Level | 1 | defines protection options |
| Partitions | Partition Count | 1 | Number of partitions on device |
| Device attr | Object Attributes | 8 | defines properties associated with all objects on device |

In one preferred embodiment, the DCO attributes include a clock which is simply a monotonic counter, a master key which includes the encryption key, or other master key which controls all other keys on the device, and a device key which controls partition keys and which may be used to lock partitions. The attributes also include a protection level key which identifies a predetermined protection level and which has associated security policies, a partition count which defines a number of partitions on the device, and object attributes which define properties associated with all objects on the particular device being accessed.

In order to adequately manage objects spanning multiple storage devices 110–112, each storage device 110–112 also preferably includes a device association object 156 which defines associations between various devices 110–112. For example, where storage devices 110 and 112 are a mirrored pair of devices, or members of an arrayed set, the device association object 156 identifies this relationship. Table 2 illustrates preferable attributes of the device association object 156.

TABLE 2

| Name | Bytes | Semantics |
|------|-------|-----------|
| Association Identifier | 2 | Unique ID ot this set |
| Association Type | 2 | Kind of Association |
| Membership List | n | |
| Association Identifier | 2 | |
| Association type | 2 | |
| Membership List | n | |

Such attributes preferably include an association identifier, which is a unique identifier for each given set of associated devices. The attributes also preferably include an association type which defines the kind of association (eg, mirrored pair, RAID 5, etc.) between the devices. The attributes further preferably include a membership list which simply identifies the devices 110–112 which are members of the above-defined association.

Each partition 158, 160 and 162 on a storage device 110–112 also preferably includes the partition control object 164 which contains the properties of a single partition. Object 164 preferably describes not only the partition but also any object attributes that pertain to all objects in the partition. Each device 110–112 preferably includes one partition control object 164 for each partition defined on the device. While FIG. 6 illustrates partition control objects stored within each partition, this need not be the case. The partition control objects can be stored in the flat file system above the partitions instead.

Table 3 indicates a number of attributes which are preferably included in the partition control objects 168.

TABLE 3

| Type | Name | Bytes | Semantics |
|------|------|-------|-----------|
|  | Master Key | 8 | Encryption keys |
|  | Current Working Key | 8 |  |
|  | Previous Working Key | 8 |  |
| Part. attr | Object Attributes | 8 | defines properties associated with all objects in partition |

Such attributes preferably include a master key which defines an encryption key for the entire partition, and which can be used to set a current working key. The attributes also preferably include a current working key and a previous working key which are preferably used for encryption and decryption of command and data messages. Partition control object 164 also preferably includes object attributes which are associated with all objects in the designated partition.

FIG. 6 also illustrates that each partition preferably includes a partition object list 166 which is an object that is built by control component 150 when a partition is created on the storage medium. Partition object list 166 preferably has the same identifier in every partition, and constitutes the point of departure for navigating the object file system implemented on the storage medium. Table 5 illustrates a list of attributes preferably associated with each partition object list.

TABLE 4

| Field | Bytes |  |
|-------|-------|---|
| OBJECT ID | 8 | ID used for any OPEN, READ, WRITE, CLOSE on this OBJECT |
| User Data | N | POL Attribute sets this, use GET ATTRIBUTE to learn value |

As illustrated in Table 4, the object preferably includes a list of object identifiers (or object IDs) for all objects resident in the partition, and the volume of user space allocated to each object. The object identifier is used by a requester in order to open, read, write and close an object. In addition, the user can preferably allocate user space for each object ID by setting the user data attribute in the partition object list. After the partition object list 166, each partition preferably includes a plurality of data objects 168. Each of the data objects 168 preferably includes one or more of the attributes set out in Table 1, and can include additional attributes, depending on the specific implementation of the data storage system.

The object oriented storage devices 110–112 preferably support requests to provide data to, or store data for, a requester 116–120. Moreover, storage devices 110–112 preferably assume responsibility for other functions that would have been done at other components, most likely in the operating system, in prior art architectures. Space management, as well as the maintenance of the attributes associated with objects on devices 110–112, is preferably performed by devices 110–112 themselves. Such functions are preferably performed by invoking methods supported by interface 128 which is implemented by control component 150 in each of storage devices 110–112. A number of the methods which can be invoked are discussed in greater detail later in the specification. However, in order to facilitate a better understanding of such methods, FIGS. 7-1 and 7-2 provide a flow diagram which illustrates the navigation of the object oriented file system in accordance with one aspect of the present invention. It is believed that discussion of FIGS. 7-1 and 7-2, prior to a detailed discussion of each of the methods which is set out below, will facilitate understanding of the present invention.

FIGS. 7-1 and 7-2, extending from blocks 170–204, illustrate finding an object in a specified partition on one of storage devices 110–112. First, the requester 116 obtains the device attributes in device control object 154. This is indicated by block 172. Invocation of the Get_DCO_Attributes method causes control component 150 to return the attributes stored in the device control object 154. This is indicated by block 174. Requestor 116 then selects a given partition based upon the attributes returned from the device control object 154. This is indicated by block 176.

Once the partition is selected by requester 116, requestor 116 then invokes the Get_DAO_Attributes method as indicated by block 173. This causes control component 150 to obtain the attributes from the device association object 156 stored on storage medium 110. Control component 150 then returns the device association attributes to requester 116 as indicated by block 175. Based on the device association attributes and the device control attributes, requester 116 selects a partition to interrogate. This is indicated by block 176.

Requestor 116 then invokes the Get_PCO_Attributes method which causes control component 150 to obtain the attributes found in the partition control object 164 which is associated with the specific partition to be interrogated by requester 116. This causes control component 150 to obtain and return the partition control object attributes. This is indicated by blocks 178 and 180. If the objects in the selected partition are not the objects which are of interest to the requestor, then the requestor selects another partition as indicated in blocks 182 and 176.

However, assuming that the requester 116 has found the partitions of interest, then the requester invokes the Get_POL_Attributes for the selected partition, as indicated in block 184. This method causes control component 150 to obtain the attributes from the partition object list 166 associated with the selected partition. These attributes are then provided to requester 116 as indicated in block 186.

Next, the requester 116 invokes an Open_Read_Only_POL method. This is indicated by block 188. As is discussed in greater detail below, the control component 150 obtains the data stored in the partition object list 166, associated with the selected partition, but modifies an attribute in that object to indicate that the data is being provided on a read only basis such that the data cannot be modified or extended. This is indicated by block 190.

The requester then invokes the Read_POL method which causes control component 150 to tender the list of objects in the selected partition for review by requester 116. This is indicated by block 194. After choosing the desired objects in the selected partition, the requester 116 invokes the close_POL method which causes the control component 150 to close the partition object list. This is indicated by block 196.

Having discovered the object ID for the desired object or objects, requester 116 then invokes the Open_xxx_Objectx method. The xxx indicates a specific open method which is invoked by the requester, based upon the particular data manipulation desired by the requester. The Objectx indicates the object ID from the partition object list which identifies the object to be manipulated or accessed by the requester. The xxx designation, for example, can represent an Open_Update operation, or an Open_Read-Only operation. These are discussed below, and this step is indicated by block 198.

The requester then performs the desired manipulation of the object returned by control component 150. Various methods which can be used to manipulate the objects are discussed in greater detail below. This is indicated by block 200.

Finally, once the desired object manipulation or access is completed by the requester, the requester 116 invokes the Close_Objectx method which is also described in greater detail below, and which operates to close the object which was accessed by requester 116.

FIGS. 8–24 are flow diagrams illustrating various exemplary methods which can be invoked by a requester in order to accomplish desired functions and desired manipulations of objects stored on an object oriented storage device, such as device 110.

FIG. 8 is a flow diagram specifically illustrating an Open_Create_Object method. When a requester 116 invokes this method, as indicated in block 208, control component 150 creates a new object ID and enters the object ID in the partition object list associated with the specific partition in which the object is to be created. This is indicated by block 210. Control component 150 then creates a new object by allocating the number of blocks, etc., associated with the object, and by modifying the object attributes to indicate the time of object creation and to set other attributes listed in Table 1 and associated with the object. This is indicated by block 212. Next, control component 150 returns the status of the request along with the new ID of the object which has just been created. This is indicated by block 214.

In addition to simply creating an object, requester 116 can specify a number of options. For example, in one preferred embodiment, requester 116 can specify whether the object is password protected, whether the object is to be encrypted, certain quality service thresholds (eg, whether the object is to be backed up), lock characteristics (eg, whether the object is to be locked by an object lock as well as any other locks, such as partition and device locks), the access control version, mirror or other backup support (which will cause all updates to be mirrored onto another object, or backed up in another way which is specified), to indicate that space will be allocated in units of a specified minimum size, and to set collision characteristics (such as write in a UNIX-type system).

The particular information which requester 116 provides to control component 150 in order to invoke this method includes permission information in systems which require this for security, the partition of the device in which the object is to be created, and any of the options mentioned above. In response, control component 150 returns, in one illustrative embodiment, the capacity available on the device, the status of the request, along with the ID of the new object.

It should also be noted that a special instance of this method can be invoked, which includes all data associated with an object. In that case, one method can be invoked which can create an object, write to the object, and close the object.

FIG. 9 is a flow diagram illustrating an Open_Update_Objectx method. When the requester 116 invokes this method, as indicated by block 220, this allows requester 116 to read and write the specified object. It also provides for extending the length of the object. When the method is invoked, control component 150 sets an attribute in the specified object indicating that the object is in use. Requester 116 provides permission information, the partition ID containing the object, the identifier of the object to be accessed, the type of action to be taken (such as update or write) and any of the options mentioned above. In response, control component 150 returns the status of the request and the length of the specified object, along with remaining capacity available to the requester 116.

FIG. 10 is a flow diagram illustrating a Write_Object method. When requester 116 invokes this method, as indicated by block 242, this causes control component 150 to write to a specified number of blocks in the designated object at the location specified.

A Write method can also cause other methods to be invoked. For example, if parity support is called for on the device 110–112 to be accessed, a write can automatically invoke an Exclusive Or method which performs an Exclusive Or operation on the data to be written, and parity data to be written to one or more previously specified parity devices.

In order to invoke this method, the requester 116 provides permission information, an object identifier, a partition ID, a starting location of blocks to be written within the object, a number of blocks to be written to the object, option information, and the data to be written. Once this method is invoked, control component 150 modifies the specified object with the specific data provided. This is indicated by block 244. Control component 150 then modifies necessary attributes in the specified object such as the length of the object, the time stamps associated with the object, etc. This is indicated by block 246. Control component 150 then modifies necessary attributes of other objects, such as the partition object list, where needed. This is indicated by block 248. Control component 150 then returns the status of the request to the specific requester. This is indicated by block 250.

FIG. 11 is a flow diagram illustrating an open_Read_Only_Objectx method. When this method is invoked, control component 150 allows the requester 116 to have access to the specified object for read only purposes. Thus, when this object is invoked, as indicated by block 230, the requester provides permission information, a partition ID, an object ID, and option information. Control component 150 then sets an attribute in the specified object indicating that the object is in use. This is indicated by block 232. Control component 150 then sets a read only attribute in the object indicating that the object cannot be written by the requester. This is indicated at block 234. The control component 150 then returns the status of the request and the length of the specified object. This is indicated by block 236.

FIG. 12 is a flow diagram illustrating a Read_Objectx method. This method is invoked by the requester 116 when requester 116 desires device 110 to return data from the specified object. The requester provides permission information, an object ID, a partition ID, a starting location of blocks to be read, a number of blocks to be read, and any other desired option information. In response, control component 150 returns the status of the request, the length of data being returned, and the actual data being returned in response to the method. This is indicated by blocks 256 and 258.

FIG. 13 is a flow diagram illustrating a Close_Objectx method. When this method is invoked by a requester 116, as indicated by block 264, the requester provides permission information, an object ID, and any desired option information. In response, control component 150 modifies the data in the specified object as indicated by block 266. In addition, any changes to the object as a result of writing to the object, if not already written to the storage media, are written at this time. Control component 150 also updates attributes of object x as indicated by block 268. For example, if the object is a newly created object, its attributes are updated with the time of creation, and other required attribute information. In addition, the attributes are modified to indicate the last time that the data in the object was modified, the length of the data, if it was changed, and an attribute is set by control component 150 which indicates that the object is no longer in use by a given requester.

Control component 150 can also, optionally, update residual cache information associated with the object and reflected in an object attribute. This is indicated by block 270. For example, if the specific requester 116 making the request is configured to inform the storage device 110 that data is still being cached for the closed object, or is no longer being cached, the operating system of storage device 110 can retain the cache information for those applications where objects will be closed and opened again in quick succession. At the same time, however, the storage device 110 can keep track of whichever components in System 100 may need to be informed in the event of coherency collisions, should another requester request access to this object in the meantime. Control component 150 then returns the status of the request as indicated by block 272.

FIG. 14 is a flow diagram illustrating the Remove_Objectx method. When this method is invoked, as indicated at block 278, control component 150 takes the necessary steps to delete the object from the storage medium. This is indicated at block 280. Control component 150 then modifies the partition object list associated with the partition from which the object was deleted, in order to reflect that the specified object ID is available. This is indicated by block 282. Control component 150 then returns the status of the request, as indicated by block 284. In order to invoke this method, requester 116 provides permission information, a partition ID, an object ID, and any desired option information. Control component 150 then returns the status of the request as indicated by block 284.

FIG. 15 is a flow diagram illustrating the Create_Partitionx method which can be invoked by a requester, as indicated by bock 290, in order to create a partition on storage device 110. It should be noted, that while the Create_Partitionx method partitions the drive into one or more regions, all space on the storage media need not be accounted for. In addition, partition regions can also span various zones on a disk.

In one embodiment, this method is used to create partitions in a tiling arrangement, with the partitions representing true divisions of the storage space on the device. This arrangement is used to divide the space by service levels such as data array. Such partitions cannot be resized, but can be removed and recreated.

In accordance with another aspect of the present invention, the partitions are used as a logical partitioning in order to organize objects logically rather than manage the space according to service levels. In this second embodiment, the partitions can be resized dynamically.

In order to invoke the method, the requester provides permission information, any desired options, a partition ID, and an initial space allocation which identifies space to be allocated to the specific portion identified. In response, control component 150 allocates space on the storage media for the specified partition, as indicated in block 292. The control component 150 then establishes a partition control object and a petition object list, as indicated by blocks 294 and 296. As discussed above, the partition object list cannot be removed and serves as a starting point for navigating objects in the partition. Control component 150 then returns the status of the request and a partition map illustrating the partitioning which has been conducted. This is indicated in block 298.

FIG. 16 is a flow diagram illustrating the Remove_partitionx method. In order to invoke this method, requester 116 provides permission information, option information, and a partition ID identifying the partition to be removed. This is indicated in block 304. In response, control component 150 de-allocates space previously associated with the partition as indicated in block 306. Control component 150 then removes all objects in the partition object list associated with the partition to be deleted, deletes the partition object list and deletes the partition control object. This is indicated by blocks 308, 310 and 312. Control component 150 then returns the status of the request and the partition map showing changes made to the partitioning. This is indicated by block 314.

In accordance with one aspect of the present invention, data management policies are communicated to each storage device 110–112, so that the storage devices can act independently of one other to execute the management policies. This provides significant advantages in that it results in not only less human intervention, but also more predictable and timely management control.

For example, data on the storage devices 110–112 may desirably be backed up each week. Conventional systems are typically backed up during an idle period on weekends, such that the system availability is not interrupted during a business week. However, the window of availability has been gradually shrinking at the same time the system capacities have been increasing. Thus, the problem of attempting to find time to interrupt a system long enough to back up possibly terabytes, of data has become very difficult.

Thus, in accordance with one aspect of the present invention, by taking action on an object based on attributes assigned to it, an object oriented storage device 110–112 can inform a backup function whenever an object has reached the correct state for its backup to be taken. Also, the backup of all files can be spread over a longer period—during which others are still being updated-without affecting data integrity.

Other examples of attributes which can invoke action by an object oriented storage device 110–112 include encryption, compression, versioning and parity redundancy. In each of these examples, the storage device 110–112 preferably need only be informed of the policy with respect to a specific object or set of objects. The device itself can then perform the function or inform an agent designated to provide the service.

For instance, compression and encryption can be performed on the storage device 110–112 itself. Therefore, the only thing which need be communicated to the device, is the fact that compression or encryption is required for an object. For a management function which is performed by an agent, not only the management function policy must be communicated to the storage device, but also an identification of an agent to perform the function, such that the agent can be accessed by the storage device when it is time to perform the function.

In accordance with one aspect of the present invention, associations are established among objects so that those with the same attributes or with dependencies can be identified. For example, assume a database includes 6 files or objects, none of which can be backed up until either all have been closed or until one designated as the object on which all of the others are dependent has been closed. A file server 114 may be needed to manage this kind of relationship between objects. In addition, the present invention also establishes inter-device dependencies as in the case of an arrayed parity set. By making it possible to establish groups in which one device or object makes certain that the rest of the group has the same essential properties, management of the group is more efficient and effective.

FIGS. 17–24 are flow diagrams which illustrate management functions which can be performed by invoking methods exposed by the objects on the storage devices. Invoking the methods causes control component 150, and/or related control components, to take steps in order to perform the management functions associated with the invoked methods.

FIG. 17 is a flow diagram illustrating the Export_Objectx method. Requester 116 invokes this method, as indicated by block 320, by providing permission information, option information, an object ID, a target device ID and a target partition ID. The export method enables a storage device 110–112 to take action based on rules expressed in attributes associated with a given object. For example, it can be used to initiate a backup or support versioning of objects to other devices.

When the Export_Objectx method is invoked, control component 150 obtains the specified object from the storage media as indicated by block 322. Control component 150 then invokes an Open_Create method at a target device specified by requester 116. This is indicated by block 324. Control component 150 then invokes a write method at a target device supplying data and attributes of the specified object. This is indicated by block 326. Control component 150 then invokes a Close method at the target device closing the object on the target device after it has been written to the target device. This is indicated by block 328. Finally, control component 150 returns the status of the request to the requester, along with the new object ID of the object which has been written to the target device. This is indicated by block 330.

The interface 128 implemented by control component 150 also supports methods which allow a requester to obtain object attributes for review, and to set object attributes. FIGS. 18 and 19 are flow diagrams which illustrate the corresponding Get_Objectx_Attributes and Get_Objectx_Attributes methods respectively.

The method illustrated in FIG. 18 once invoked as indicated by block 336, causes control component 150 to obtain attributes for a specified object. In one illustrative embodiment, the requester provides permission information, an object ID, or a list of object IDs, and option information. Control component 150 then obtains the attributes associated with the object ID, or the list of object IDs, and returns those attributes, along with a status of the request to the requester. This is indicated by block 338.

The Get_Objectx_Attributes method illustrated in FIG. 19 can be invoked as indicated in block 344, by a requester providing permission information, an object ID, and option information to control component 150. Control component 150 then modifies the attributes of the specified object with the information provided by the requester, and returns a status of the request, along with the attributes of the specified object, as modified. This is indicated by blocks 346 and 348.

In accordance with another aspect of the present invention, objects can be locked so that they can only be accessed once they are unlocked by a server that owns the lock that has been placed on the object. In one illustrative embodiment, objects can be locked at the object level, the partition level, or the device level. The lock mechanism provides for inter-server access resolution. Such locks, in one preferred embodiment are used for scheduling concurrent updates as well as prohibiting access during maintenance functions. FIGS. 20, 21 and 22 are flow diagrams illustrating lock methods which can be thought of as instances of the Get_Attribute and Set_Attribute methods. However, additional detail is provided for these specific instances of those methods, such that they can be used in the sharing of data among the cluster of requesters.

FIG. 20 is a flow diagram illustrating the Read_Lock_Attributes method. This method can be invoked, as illustrated by block 354, by providing permission information, object, partition or device ID, lock parameters, and any desired option information from a requester 116 to control component 150. In response, control component 150 determines whether the specified object has a lock which is set. Control component 150 then returns the status of the request of a requester owning the lock. This is indicated by block 356.

FIG. 21 is a flow diagram illustrating the Set_Lock_Attributes method. This method can be invoked by a requester, as indicated by block 362, by providing permission information, object, partition or device identifier information, lock parameters and option information. When this method is invoked, control component 150 inspects a lock associated with the identified object. This is indicated by block 364. The control component then attempts to perform a lock or unlock operation with the requester's identification. This is indicated by block 366. If the requester requesting the operation is the owner of the lock, then the operation will be performed. If not, the operation will not be performed. In any case, control component 150 returns a status of the request along with the ID of the server which owns the lock. This is indicated by block 368.

FIG. 22 is a flow diagram illustrating the Reset_Lock_Attribute method. This function is used in an attempt to reset a lock in an event that the server which owns the lock is no longer functioning. The method can be invoked, as illustrated by block 374, by providing permission information, object, partition or device identifier information, lock parameters, and any desired option information. In response, control component 150 locks the specified object, partition or device, as indicated by block 376, and returns the status of the request along with the identification of the server which owns the lock. This is indicated by block 378.

FIGS. 23 and 24 are flow diagrams illustrating Get and Set_Device_Association methods. These methods define or interrogate relationships among devices 110–112. One illustrative implementation of such relationships includes that one of the storage devices 110–112 is identified as a master of a first set of devices, and others being dependent members of that set. The first or master of the set, is responsible for disseminating to the other members changes in set attributes. Other members reject attribute settings if they are not provided from the first or master of the set. In order for storage devices 110–112 to perform these functions, they are provided with the ability to perform a self-inspection. This allows the devices to inspect themselves to determine whether they are included in a membership of a larger device group.

In FIG. 23, the Get_Device_Associations method is illustrated. This method can be invoked, as indicated by block 384, by providing permission information and option information. In response, control component 150 returns the status of the request, and the requested associations for which the device is a member. This is indicated by block 386. FIG. 24 is a flow diagram illustrating the Set_Device_Associations method. This method can be invoked, as indicated by block 392, by providing permission information, option information, and a list of members and attributes defining the associations. In response, control component 150 modifies the device association object 156 contained on the storage media, as indicated by block 394. The device association object is modified to include the attributes provided by the requester, and to include a time stamp showing when the object attributes were last modified, etc. Control component 150 returns the status of the request, as indicated by block 396.

The permission information described above illustratively allows the file server 114 to gate access to storage by controlling which requesters 116–120 the file server 114 gives the credentials needed to obtain a response from a storage device 110–112. File server 114 also dictates to the storage devices 110–112 that they must only honor I/O requests which adhere to the installation security policy. The keys underlying the permissions security capability are illustratively communicated to the storage devices 110–112 by the Set_Object_Attributes method. If an appropriate level of security is set for a storage device 110–112, that storage device may be configured to check every I/O command for security compliance. However, as discussed above, some applications need not employ security. Further, if a particular server cluster has some devices located in another physical facility, it may be desirable to define a higher level of security for communication with the remotely located devices, but not for communication from local traffic. This allows the employment of security for remotely located requesters or servers, but avoids the performance loss which would accompany employing such security for local requesters or servers as well.

Further, each storage device 110–112 preferably includes a readable monotonically incrementing clock to be used for time stamping secure messages and objects. In one illustrative embodiment, the clocks for the various devices are synchronized on a system-wide basis. In another illustrative embodiment, file server 114 accommodates for discrepancies and values from storage device-to-storage device.

Thus, it can be seen that the present invention provides object oriented storage devices such as disk drives, which provide significant advantages over conventional storage devices. The object oriented storage devices significantly improve the cluster architecture. For example, by storing data in an object oriented fashion, the data can be managed by the storage device itself. Objects provide the storage device with sufficient knowledge of its resident data such that it can assume responsibility for managing its own space. Further, sharing of data can be controlled more intelligently when the device has information about what constitutes a logical entity. For example, if two systems were to share data stored on a block oriented device, all metadata activity would have to be controlled for concurrent access. By contrast, in an object oriented device, much of the metadata activity is opaque to the systems accessing it. Thus, the systems need only concern themselves with access conflicts to user data. Further, space management being performed by the device itself eliminates any contention or confusion which can arise from two systems trying to manage space on the same storage device at the same time.

In addition, heterogeneous computing is made much easier by an object abstraction. Object oriented storage devices provide the ability to at least have an organization which an operating system can interpret.

Further, the performance in a clustered system is enhanced by using object oriented storage devices for a number of reasons. For example, the metadata need never leave the device itself, eliminating a certain number of I/O operations.

In addition, the device knows which objects are open or closed at any one time, and is able to use this information to more effectively cache data. Pre-fetching can also be much more effective, since the device knows the layout of the object being read. The storage device can more effectively determine sequential access patterns. The cache in the device can also hold metadata once for multiple systems which are accessing it. Further, the device can participate in quality of service decisions, such as where to locate data more appropriately. The device can typically only do this if it has responsibility for allocating storage. By contrast, almost no operating systems can allocate data, by zone, on a disc drive. Thus, providing this capability on the drive itself enhances performance.

The present invention provides a storage device 112 which includes a storage media 132 having stored thereon data configured as a plurality of objects 124–126, each having attributes indicative of characteristics of the object. A control component 150 is operably coupled to the storage media 132 and is configured to provide an interface 128 to the objects 124–126. The interface exposes (method 0-method N) which are invoked to access the objects 124–126.

In one preferred embodiment, the plurality of objects 124–126 include a device control object 154 which has attributes indicative of characteristics of the data storage device 110. In another preferred embodiment, the storage media is divided into a plurality of partitions 158, 160, 162, wherein each partition includes a plurality of objects 124–126. The plurality of objects illustratively includes a plurality of partition control objects 164 corresponding to the plurality of partitions 158, 160 and 162, wherein each partition control object 164 includes attributes indicative of characteristics of the corresponding partition. The partition control object 164 can also include characteristics pertaining to all objects in the corresponding partition. A plurality of partition list objects 166 are illustratively associated with the plurality of partitions 158, 160 and 162 and include attributes indicative of identifying data, identifying objects stored in an associated partition.

The methods exposed by interface 128 include a remove method which causes control component 150 to delete a specified object from the storage media 132 by releasing identifying data previously associated with the specified object. The methods also illustratively include a create partition method which, when invoked, causes control component 150 to divide the storage media 132 into a plurality of partitions. A remove partition method is illustratively invoked and causes control component 150 to remove a specified partition from the storage media 132.

In another illustrative embodiment, the plurality of objects includes a device association object 156 which includes attributes indicative of associations among two or more data storage devices. A device association method is invoked and causes control component 150 to access the association attributes. The device association method can be used to cause control component 150 to obtain and return the association attribute or to access association attributes.

In another illustrative embodiment, the methods include an open method, which, when invoked by a requester 116, provides the requester 116 with access to an object on the storage device 110.

An open create method, when invoked by a requester 116, causes the control component 150 to create a new object in the storage media 132 having attributes specified by the requester 116.

In another illustrative embodiment, an open update method is provided which, when invoked by a requester 116, causes control component 150 to modify an object identified by the requester in a way specified by the requester 116. A write method can be invoked to cause the control component 115 to write data to a specified object, and a close method can be invoked to cause control component 150 to close a specified object.

In another illustrative embodiment, an export object method can be invoked to cause control component 150 to copy a specified object to a second data storage device 112. A get object attributes method and a set object attributes method are also provided which can be invoked to cause control component 150 to obtain and return attributes of a specified object, or to set attributes of a specified object. A lock method can also be used to cause control component 150 to access lock attributes of a specified object.

The present invention can also be implemented as a method of storing data on a disc drive. The method includes steps of storing information on a disc as objects and accessing the information by invoking a number of methods (or functions) as set out above. The present invention can also be implemented as a data storage system including one or more disc drives arranged as discussed above with respect to a data storage device. The present invention can also be implemented as a computer readable medium (such as memory in control component 150, or one of discs 132, or another computer readable medium) storing instructions which, when executed by a computer in a data storage system, cause the computer to store data on a disc 132 as a plurality of objects 124–126 having attributes indicative of characteristics of the objects. The instructions, when executed, also cause the computer to access objects on the disc 132 through an interface to the objects by invoking functions exposed by the interface.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular interface methods used while maintaining substantially the same functionality without departing from the scope and spirit of the present invention.

What is claimed is:

1. A data storage device configurable to perform a data storage function by being coupled to a host in a computer system, the data storage device comprising:

non-volatile storage media having stored thereon data configured as a plurality of objects, each object having attributes indicative of characteristics of the object; and a data storage device control component, configured to be coupled to the host and operably coupled to the storage media, and configured to manage storage of the objects on the storage media according to an object file system by providing an interface to the objects, the interface exposing methods which are invoked to access the objects.

2. The data storage device of claim 1 wherein the plurality of objects comprises:

a device control object including attributes indicative of characteristics of the data storage device.

3. The data storage device of claim 2 wherein the device control object includes attributes indicative of characteristics of other objects of the plurality of objects on the storage media.

4. The data storage device of claim 1 wherein the storage media is divided into a plurality of partitions, each partition including a plurality of objects.

5. The data storage device of claim 4 wherein the plurality of objects comprises:

a plurality of partition control objects corresponding to the plurality of partitions, each partition control object including attributes indicative of characteristics of the corresponding partition.

6. The data storage device of claim 5 wherein each of the partition control objects comprises attributes indicative of characteristics pertaining to all objects in the corresponding partition.

7. The data storage device of claim 4 wherein the plurality of objects comprises:

a plurality of partition list objects associated with the plurality of partitions, each partition list object including attributes indicative of identifying data identifying objects stored in an associated partition.

8. The data storage device of claim 7 wherein the methods comprise:

a remove method which, when invoked, causes the control component to delete a specified object from the storage media by releasing identifying data previously associated with the specified object.

9. The data storage device of claim 7 wherein the each of the plurality of partition list objects is stored in the associated partition.

10. The data storage device of claim 4 wherein the methods comprise:

a create partition method which, when invoked, causes the control component to divide the storage media into the plurality of partitions.

11. The data storage device of claim 4 wherein the methods comprise:

a remove partition method which, when invoked, causes the control component to remove a specified partition from the storage media.

12. The data storage device of claim 1 wherein some of the plurality of objects have portions thereof stored on a plurality of storage devices and wherein the plurality of objects comprises:

a device association object including association attributes indicative of associations among two or more data storage devices.

13. The data storage device of claim 12 wherein the methods comprise:

a device association method which, when invoked, causes the control component to access the association attributes.

14. The data storage device of claim 13 wherein the device association method comprises:

a get association attributes method which, when invoked, causes the control component to obtain and return the association attributes.

15. The data storage device of claim 13 wherein the device association method comprises:
   a set association attributes method which, when invoked, causes the control component to set the association attributes.

16. The data storage device of claim 1 wherein the storage device is coupleable to a requester and wherein the methods comprise:
   an open method which, when invoked by the requester, provides the requester with access to an object on the storage device.

17. The data storage device of claim 16 wherein the open method comprises:
   an open create method which, when invoked by the requester, causes the control component to create a new object on the storage media having attributes specified by the requester.

18. The data storage device of claim 16 wherein the open method comprises:
   an open update method which, when invoked by a requester, causes the control component to modify an object identified by the requester in a way specified by the requester.

19. The data storage device of claim 16 wherein the open method comprises:
   an open read method which, when invoked by the requester, causes the control component to open an object identified by the requester for reading only.

20. The data storage device of claim 1 wherein the storage device is coupleable to a requester and wherein the methods comprise:
   a read method which, when invoked by the requester, causes the control component to return data stored in an object specified by the requester.

21. The data storage device of claim 20 wherein the methods comprise:
   a write method which, when invoked by the requester, causes the control component to write data specified by the requester to an object specified by the requester.

22. The data storage device of claim 20 wherein the methods comprise:
   a close method which, when invoked by the requester, causes the control component to identify a specified object previously opened by the requester as closed.

23. The data storage device of claim 22 wherein the close method further causes the control component to save changes made to the specified object while the specified object was open.

24. The data storage device of claim 1 wherein the data storage device is coupleable to a second data storage device and wherein the methods comprise:
   an export object which, when invoked, causes the control component to copy a specified object to the second data storage device.

25. The data storage device of claim 1 wherein the data storage device is coupleable to a requester and wherein the methods comprise:
   a get object attributes method which, when invoked by the requester, causes the control component to obtain and return attributes of an object specified by the requester.

26. The data storage device 1 wherein the data storage device is coupleable to a requester and wherein the methods comprise:
   a set object attributes method which, when invoked by the requester, causes the control component to set attributes of an object specified by the requester.

27. The data storage device of claim 1 wherein the methods comprise:
   a lock method which, when invoked, causes the control component to access lock attributes of a specified object, the lock attributes being indicative of whether one of the specified object, a specified partition, and the data storage device are currently accessible.

28. A method of storing data on a disc drive, the method comprising steps of:
   (a) using a disc drive controller on the disc drive, storing data on a disc according to an object file system as a plurality of objects, each object having attributes indicative of characteristics of the object; and
   (b) accessing the objects on the disc through the disc drive controller and through the object file system which includes an interface to the objects by invoking functions exposed by the interface.

29. The method of claim 28 wherein the storing step (a) comprises a step of:
   (a) (1) storing a device control object on the disc including attributes indicative of characteristics of the data storage device.

30. The method of claim 28 wherein the disc is divided into a plurality of partitions, each partition including a plurality of objects, and wherein the storing step (a) comprises a step of:
   (a) (1) storing on the disc one of a plurality of partition control objects corresponding to a selected one of the plurality of partitions, each partition control object including attributes indicative of characteristics of the corresponding partition.

31. The method of claim 30 wherein the storing step (a) comprises a step of:
   (a) (3) storing on the disc one of a plurality of partition list objects associated with the plurality of partitions, each partition list object including attributes indicative of identifying data identifying objects stored in an associated partition.

32. The method of claim 31 wherein the accessing step (b) comprise a step of:
   invoking a remove function to delete a specified object from the disc by releasing identifying data previously associated with the specified object.

33. The method of claim 31 wherein the accessing step (b) comprises a step of:
   invoking at least one of a create partition function to divide the disc into the plurality of partitions, and a remove partition function to remove a specified partition from the disc.

34. The method of claim 28 the storing step (a) comprises a step of:
   storing a device association object including association attributes indicative of associations among two or more disc drives.

35. The method of claim 34 wherein the accessing step (b) comprises a step of:
   invoking a get association attributes function to obtain and return the association attributes; and
   invoking a set association attributes function to set the association attributes in the device association object.

36. The method of claim 28 wherein the disc drive is coupleable to a requester and wherein the accessing step (b) comprise a step of:
   invoking an open function to provide the requester with access to an object on the disc drive, the step of invoking the open function including at least one of the steps of:

invoking an open create function to create a new object on the disc having attributes specified by the requester;

invoking an open update function to modify an object identified by the requester in a way specified by the requester; and invoking an open read function to open an object identified by the requester for reading only.

37. The method of claim 28 wherein the disc drive is coupleable to a requester and wherein the accessing step (b) comprises steps of at least one of:

invoking a read function to return data stored in an object specified by the requester;

invoking a write function to write data specified by the requester to an object specified by the requester; and invoking a close function to identify a specified object previously opened by the requester as closed.

38. The method of claim 28 wherein the disc drive is coupleable to a second disc drive and wherein the accessing step (b) comprises a step of:

invoking an export object function to copy a specified object to the second disc drive.

39. The method of claim 28 wherein the accessing step (b) comprises a step of:

invoking a lock function to access lock attributes of a specified object, the lock attributes being indicative of whether one of the specified object, a specified partition, and the data storage device are currently accessible.

40. A data storage system including a first disc drive, the first disc drive comprising:

a data head;

a data storage disc, rotatably mouinted relative to the data head and having stored thereon data configured as a plurality of objects, each object having attributes indicative of characteristics of the object; and a disc drive control component, operably coupled to the data storage disc, configured to manage the objects according to an object file system by providing an interface to the objects, the interface exposing methods which are invoked to access the objects.

41. The data storage system of claim 40 wherein the plurality of objects comprises:

a device control object including attributes indicative of characteristics of the first disc drive and indicative of characteristics of other objects of the plurality of objects on the storage media.

42. The data storage system of claim 40 wherein the data storage disc is divided into a plurality of partitions, each partition including a plurality of objects, and wherein the plurality of objects comprises:

a plurality of partition control objects corresponding to the plurality of partitions, each partition control object including attributes indicative of characteristics of the corresponding partition and indicative of characteristics pertaining to all objects in the corresponding partition; and a plurality of partition list objects associated with the plurality of partitions, each partition list object including attributes indicative of identifying data identifying objects stored in an associated partition.

43. The data storage system of claim 42 wherein the methods comprise:

a remove method which, when invoked, causes the control component to delete a specified object from the data storage disc by releasing identifying data previously associated with the specified object;

a create partition method which, when invoked, causes the control component to divide the data storage disc into the plurality of partitions; and a remove partition method which, when invoked, causes the control component to remove a specified partition from the data storage disc.

44. The data storage system of claim 40 including a second disc drive operably coupled to the first disc drive and wherein the plurality of objects comprises:

a device association object including association attributes indicative of associations among two or more disc drives, and wherein the methods comprise a device association method which, when invoked, causes the control component to access the association attributes.

45. A computer readable medium having instructions stored thereon which, when executed by a disc drive controller in a data storage system, cause the disc drive controller to perform steps of:

(a) storing data on a data storage disc according to an object file system as a plurality of objects, each object having attributes indicative of characteristics of the object; and (b) accessing the objects on the data storage disc through the object file system which includes an interface to the objects by invoking functions exposed by the interface.

* * * * *

UNITED STATES PATENT AND TRADEMARK OFFICE
CERTIFICATE OF CORRECTION

PATENT NO. : 6,298,401 B1
DATED : October 2, 2001
INVENTOR(S) : Anderson

It is certified that error appears in the above-identified patent and that said Letters Patent is hereby corrected as shown below:

<u>Column 4,</u>
Line 10, replace "system 110" with -- system 100 --.
Line 16, replace "system 110" with -- system 100 --.

<u>Column 23,</u>
Line 34, replace "mouinted" with -- mounted --.

Signed and Sealed this

Twenty-first Day of January, 2003

JAMES E. ROGAN
*Director of the United States Patent and Trademark Office*